United States Patent
Seo et al.

(10) Patent No.: US 9,565,006 B2
(45) Date of Patent: *Feb. 7, 2017

(54) METHOD AND APPARATUS FOR TRANSMITTING RECEPTION CONFIRMATION IN WIRELESS COMMUNICATION SYSTEM

(71) Applicant: LG Electronics Inc., Seoul (KR)

(72) Inventors: Dongyoun Seo, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 68 days.

This patent is subject to a terminal disclaimer.

(21) Appl. No.: 14/414,663

(22) PCT Filed: Jul. 16, 2013

(86) PCT No.: PCT/KR2013/006351
§ 371 (c)(1),
(2) Date: Jan. 13, 2015

(87) PCT Pub. No.: WO2014/014254
PCT Pub. Date: Jan. 23, 2014

(65) Prior Publication Data
US 2015/0195072 A1  Jul. 9, 2015

Related U.S. Application Data

(60) Provisional application No. 61/672,256, filed on Jul. 16, 2012.

(51) Int. Cl.
*H04L 5/00* (2006.01)
*H04W 72/04* (2009.01)
(Continued)

(52) U.S. Cl.
CPC .......... *H04L 5/0055* (2013.01); *H04L 1/1614* (2013.01); *H04L 1/1854* (2013.01); *H04W 72/0406* (2013.01); *H04W 72/12* (2013.01)

(58) Field of Classification Search
None
See application file for complete search history.

(56) References Cited

U.S. PATENT DOCUMENTS 8,885,526 B2 * 11/2014 He ................. H04L 5/1469
370/280
9,094,960 B2 * 7/2015 He ................. H04W 72/0406
(Continued)

FOREIGN PATENT DOCUMENTS

| WO | 2011084038 | 7/2011 |
| WO | 2012044082 | 4/2012 |
| WO | 2012093876 | 7/2012 |

*Primary Examiner* — Eunsook Choi
(74) *Attorney, Agent, or Firm* — Dentons US LLP

(57) ABSTRACT

Provided are a method and an apparatus for transmitting acknowledgement/not-acknowledgement (ACK/NACK) in a wireless communication system. The method comprises: receiving at least two downlink subframes among a plurality of downlink subframes; and transmitting, from an uplink subframe, the ACK/NACKs of the at least two downlink subframes, wherein at least two semi-persistent scheduling (SPS) data channels can be assigned to the plurality of the downlink subframes.

7 Claims, 14 Drawing Sheets

(51) Int. Cl.
*H04L 1/16* (2006.01)
*H04L 1/18* (2006.01)
*H04W 72/12* (2009.01)

(56) References Cited

U.S. PATENT DOCUMENTS

2012/0113876 A1 5/2012 Li et al.
2012/0155413 A1 6/2012 Liu et al.
2012/0300635 A1* 11/2012 Jersenius .......... H04W 72/0486
370/235

* cited by examiner

METHOD AND APPARATUS FOR TRANSMITTING RECEPTION CONFIRMATION IN WIRELESS COMMUNICATION SYSTEM

This application is a 35 USC §371 National Stage entry of International Application No. PCT/KR2013/006351 filed on Jul. 16, 2013, and claims priority to U.S. Provisional Application No. 61/672,256 filed on Jul. 16, 2012, all of which are hereby incorporated by reference in their entireties as if fully set forth herein.

BACKGROUND OF THE INVENTION

Field of the Invention

The present invention relates to wireless communication, and more particularly, to a method for transmitting reception confirmation in a wireless communication system and an apparatus using the method.

Related Art

A wireless communication system may use a hybrid automatic repeat request (HARQ). The HARQ is a scheme where a transmitter transmits data and then receivers ACK/NACK (acknowledgement/not-acknowledgement) being reception confirmation information with respect to the data, transmits new data or retransmits the transmitted data according to the ACK/NACK.

3GPP (3rd Generation Partnership Project) LTE (long term evolution)/LTE-A (long term evolution-advanced) may transmit the ACK/NACK through a PUCCH (physical uplink control channel) being an uplink control channel. When the ACK/NACK is transmitted through the PUCCH, a resource (PUCCH resource) configuring the PUCCH may be implicitly or explicitly determined. For example, the PUCCH resource may be determined based on a resource occupied by a PDSCH (physical downlink shared channel) being a target of the ACK/NACK response or a control channel scheduling data (transmission block or code-word). Such a PUCCH resource refers to an implicit PUCCH resource. Meanwhile, a case of explicitly indicating and using one or a plurality of resource according to a higher-layer signal refers to an explicit PUCCH resource.

Meanwhile, the wireless communication system may transmit data by using semi-persistent scheduling (SPS). The semi-persistent scheduling (SPS) is a scheduling method that transmits, when indicating activation/re-activation of the SPS once through a control channel after pre-designating subframes that can data through the higher-layer signal, data by a modulation and coding scheme (MCS), a resource, and the like indicated by the control channel by using the predesignated subframes. Therefore, a control channel exists, which corresponds to a data channel in the same subframe as the control channel that indicates the SPS activation/re-activation among data channels transmitted by the SPS, but no control channel corresponding to the data channels by the SPS exists in the corresponding subframe.

In the related art, transmission data by the SPS was used under a predetermined limit. For example, there was a limit that only one SPS is set in downlink subframes which are targets of the ACK/NACK, which are transmitted in one uplink subframe. As a result, only one data channel (SPS data channel) by the SPS is transmitted in the downlink subframes and when the ACK/NACK is transmitted in the uplink subframe, only one SPS data channel is just considered.

However, in a future wireless communication system, the SPS can be used without the limit. Accordingly, an ACK/NACK transmission method premising the limit is modified or a new ACK/NACK transmission is required.

SUMMARY OF THE INVENTION

The present invention provides a method and an apparatus for transmitting ACK/NACK in a wireless communication system.

In an aspect, there is provided a method for transmitting an acknowledgement/non-acknowledgement (ACK/NACK) in a wireless communication system. The method comprises receiving at least two downlink subframes among a plurality of downlink subframes and transmitting ACKs/NACKs for the at least two downlink subframes in an uplink subframe, wherein at least two data channels by semi-persistent scheduling (SPS) is configurable in the plurality of downlink subframes.

In another aspect, there is provided an apparatus for transmitting an acknowledgement/non-acknowledgement (ACK/NACK) in a wireless communication system. The apparatus comprises a radio frequency (RF) unit which transmits or receives a radio signal and a processor connected with the RF unit, wherein the processor receives at least two downlink subframes among a plurality of downlink subframes and transmits ACKs/NACKs for the at least two downlink subframes in an uplink subframe and at least two data channels by semi-persistent scheduling (SPS) are configurable in the plurality of downlink subframes.

ACK/NACK for a plurality of PDSCHs by SPS can be efficiently transmitted.

DESCRIPTION OF EXEMPLARY EMBODIMENTS

User Equipment (UE) may be fixed or mobile, and may be called other terms such as an MS (mobile station), an MT (mobile UE), a UT (user UE), an SS (subscriber station), a wireless device, a PDA (personal digital assistant), a wireless modem, a handheld device, and the like.

Generally, a base station means a fixed station communicating with the UE, and may be called as other terms such as an eNB (evolved-NodeB), a BTS (Base Transceiver System), and an Access Point.

Figure 1:
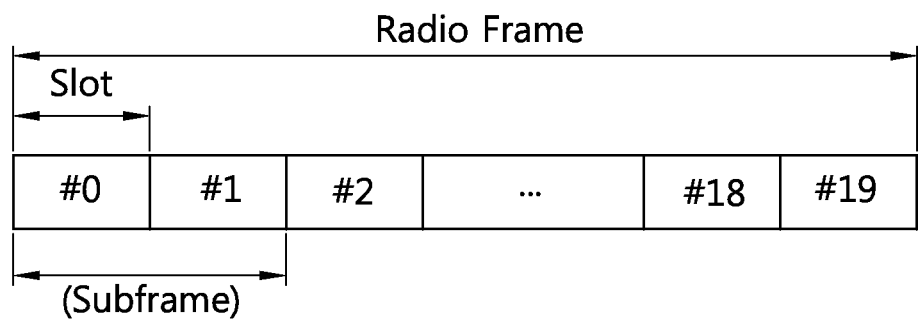
FIG. 1 illustrates a structure of a frequency division duplex (FDD) radio frame in a 3GPP LTE.

FIG. 1 illustrates a structure of a frequency division duplex (FDD) radio frame in a 3GPP LTE. The structure of a frequency division duplex (FDD) radio frame may refer to a fourth section of 3GPP TS 36.211 V8.7.0 (2009-05) "Evolved Universal Terrestrial Radio Access (E-UTRA); Physical Channels and Modulation (Release 8)".

The radio frame includes 10 subframes marked with indexes of 0-9. One subframe includes two continuous slots. A time required to transmit one subframe is a TTI (transmission time interval). For example, a length of one subframe may be 1 ms (milli-second), and a length of one slot may be 0.5 ms.

Figure 2:
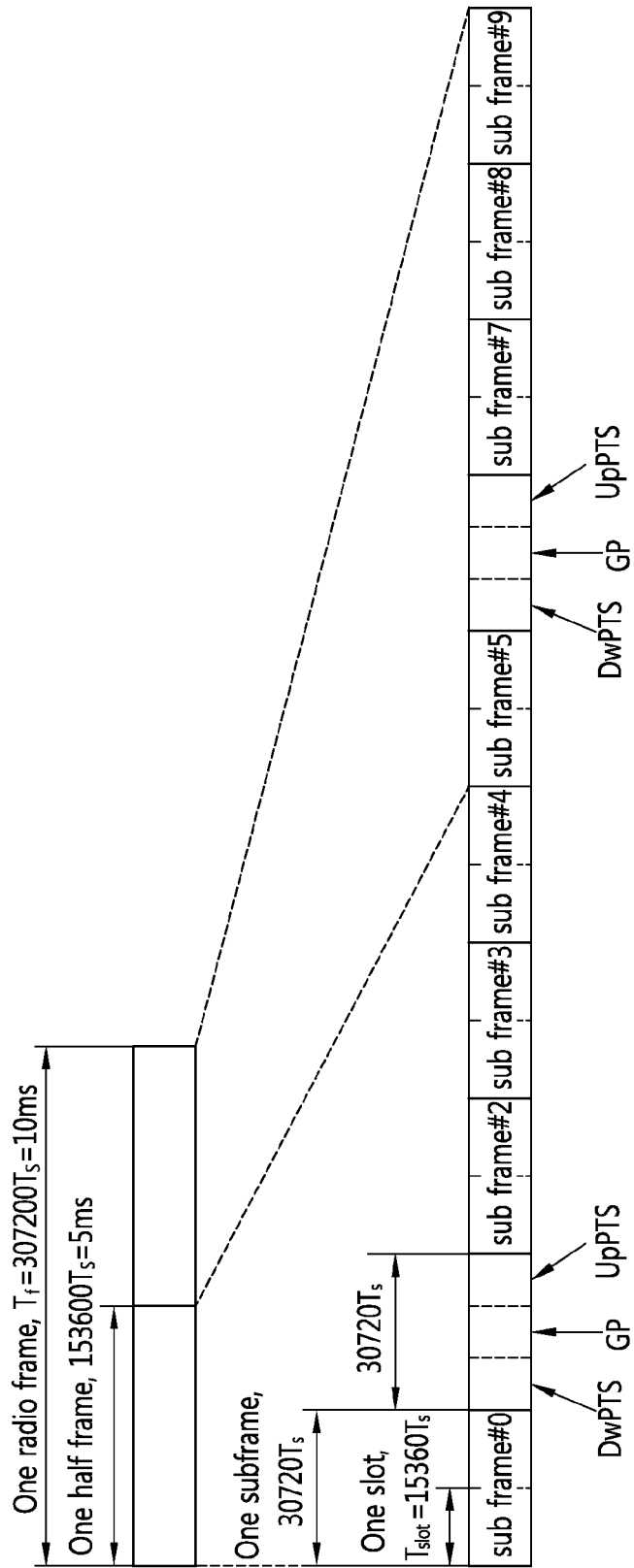
FIG. 2 illustrates a structure of a time division duplex (TDD) radio frame in a 3GPP LTE.

FIG. 2 illustrates a structure of a time division duplex (TDD) radio frame in a 3GPP LTE. A time interval of one radio frame has the relationship of $307200 \cdot T_s = 10$ millisecond (ms).

A downlink (DL) subframe, a Uplink (UL) subframe, and a special subframe (S subframe) may coexist in the TDD radio frame.

Table 1 describes an example of UL-DL configuration of a radio frame.

TABLE 1

| UL-DL config-uration | Switch-point period-icity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the table 1, the 'D' represents a DL subframe, the 'U' represents an UL subframe, and the 'S' represents a special subframe. If the UL-DL configuration is received from the base station, the UE may know which subframe in the radio frame is a DL subframe or an UL subframe according to the UL-DL configuration.

Meanwhile, when 10 subframes are indexed from 0 to 9 in the radio frame, a subframe having subframe indexes #1 and #6 may include a special subframe. The special subframe includes a Downlink Pilot Time Slot (DwPTS), a Guard Period (GP), and an Uplink Pilot Time Slot (UpPTS). The DwPTS is used for initial cell search, synchronization or channel estimation in the UE. The UpPTS is used for channel estimation in the base station and uplink transmission synchronization of the UE. The GP is an interval to remove interference caused in uplink due to multi-path delay of an uplink signal between uplink and downlink.

Figure 3:
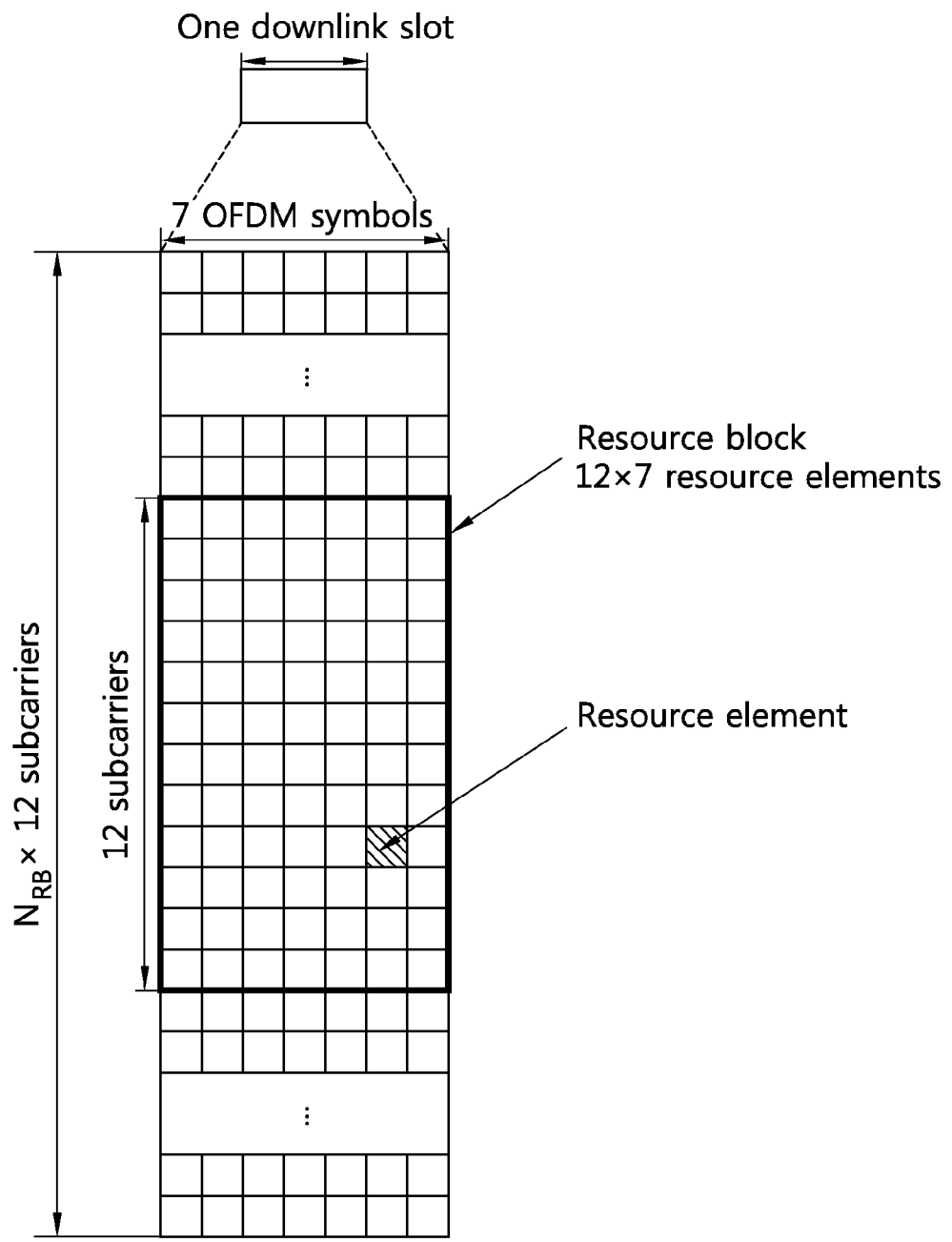
FIG. 3 illustrates an example of a resource grid with respect to one downlink slot.

FIG. 3 illustrates an example of a resource grid with respect to one downlink slot.

Referring to FIG. 3, a downlink slot includes a plurality of OFDM symbols in a time domain and $N_{RB}$ Resource Blocks (RBs) in a frequency domain. The RB includes one slot in the time domain in a resource allocation unit, and a plurality of continuous sub-carriers in a frequency domain. The number $N_{RB}$ of RBs included in the downlink slot depends on a downlink transmission bandwidth set in a cell. For example, the number $N_{RB}$ of RBs in the LTE system may be one of 6 to 110. A structure of the uplink slot may be the same as a structure of the downlink slot.

Meanwhile, each element on the resource grid is a resource element (RE). The resource element on the resource grid may be identified by an index pair (k,l) in a slot. In this case, a k (k=0, . . . , $N_{RB} \times 12-1$) represents a sub-carrier index, and l (l=0, . . . , 6) represents an OFDM symbol index in the slot.

Although FIG. 3 has illustrated that one RB is configured by 7 OFDM symbols in a time domain and 12 sub-carriers in a frequency domain to include 7×12 resource elements, and the number of OFDM symbols and the number of sub-carriers in the RB are not limited thereto. A 1 slot in a normal CP may include 7 OFDM symbols, and a 1 slot in an extended CP may include 6 OFDM symbols. The number of the OFDM symbols and the number of the sub-carriers may be variously changed according to a length of the CP, a frequency spacing, and the like. One of 128, 256, 512, 1024, 1536, and 2048 may be selectively used as the number of sub-carriers in one OFDM symbol.

Figure 4:
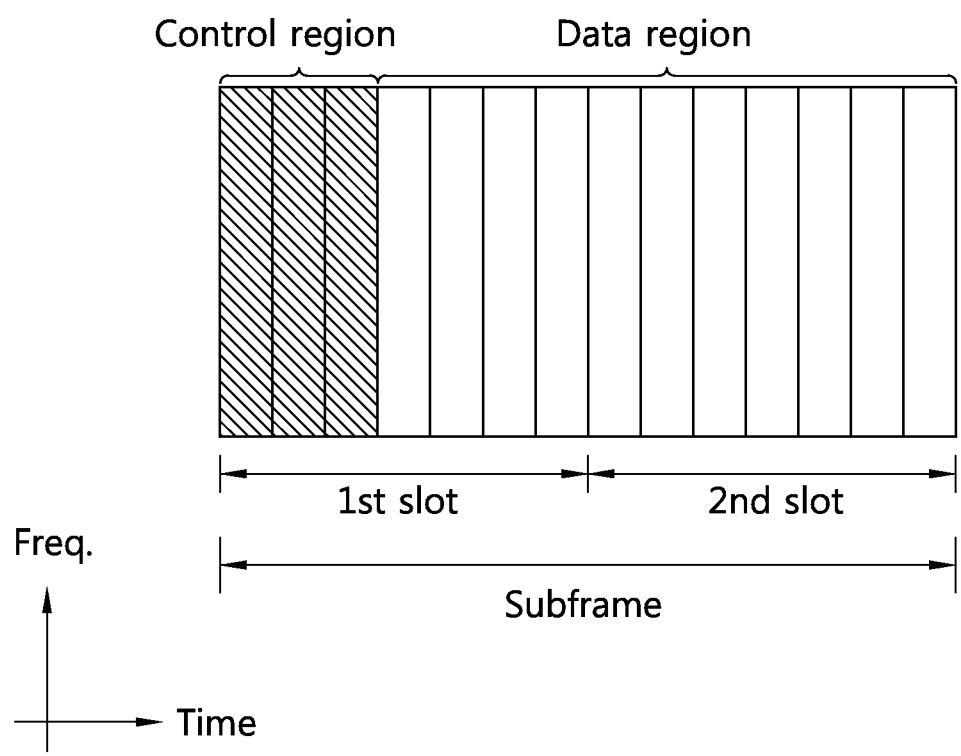
FIG. 4 illustrates a downlink subframe.

FIG. 4 illustrates a downlink subframe.

A downlink (DL) subframe is divided into a control region and a data region in a time region. The control region include maximum 4 OFDM symbols before a first slot in a subframe, but the number of OFDM symbols included in the control region may be changed. A PDCCH (Physical Downlink Control Channel) and other control channel are allocated to the control region, and a PDSCH is allocated to the data region.

As disclosed in 3GPP TS 36.211 V10.2.0, a physical control channel in a 3GPP LTE/LTE-A includes a PDCCH (Physical Downlink Control Channel), a PCFICH (Physical Control Format Indicator Channel), and a PHICH (Physical Hybrid-ARQ Indicator Channel).

A PCFICH transmitted from a first OFDM symbol of the subframe transfers a CFI (control format indicator) regarding the number of OFDM symbols (that is, a size of the control region) used to transmit control channels in the subframe. A wireless device firstly receives a CFI on the PCFICH, and then monitors the PDCCH. Unlike the PDCCH, the PCFICH does not use blind decoding, but is transmitted through a fixed PCFICH resource of the subframe.

The PHICH transfers ACK (acknowledgement)/NACK (not-acknowledgement) signals for uplink (UL) HARQ (hybrid automatic repeat request) process. The ACK/NACK signals regarding UL data on the PUSCH transmitted by the UE are transmitted on the PHICH by the base station.

A PBCH (Physical Broadcast Channel) is transmitted from four OFDM symbols before a second slot of a first subframe of the radio frame. The PBCH transfers essential system information to communicate with the base station, and the system information transmitted through the PBCH refers to MIB (master information block). Meanwhile, system information transmitted on a PDSCH indicated by the PDCCH refers to an SIB (system information block).

Control information transmitted through the PDCCH refers to downlink control information (DCI). The DCI may include resource allocation of the PDSCH (refers to DL grant (downlink grant) or DL assignment (DL assignment)), resource allocation of PUSCH (refers to UL grant), a set of transmission power control commands and/or activation of VoIP (Voice over Internet Protocol) with respect to individual UEs in a predetermined UE group.

Transmission of a DL transmission block in a 3GPP LTE/LTE-A is performed a pair of the PDCCH and the PDSCH. Transmission of a UL transmission block is performed a pair of the PDCCH and the PDSCH. For example, the wireless device receives a DL transmission block on a PDSCH indicated by the PDCCH. The wireless device monitors the PDCCH in a DL subframe, and receives DL resource assignment on the PDCCH. The radio device receives a DL transmission block on a PDSCH indicated by the DL resource assignment.

The base station determines a PDCCH format according to a DCT to be sent to the wireless device to attach a CRC (Cyclic Redundancy Check) to a DCI, and masks unique identifier (refers to RNTI (Radio Network Temporary Identifier) according an owner or an application the PDCCH to CRC.

In a case of a PDCCH for a specific wireless device, an unique identifier of the wireless device, for example, a C-RNTI (Radio Network Temporary Identifier) may be masked to the CRC. Alternatively, in a case of a PDCCH for a paging message, a paging indication identifier, for example, a P-RNTI (Paging-RNTI) may be masked to the CRC. In a case of a PDCCH for system information, system information identifier, that is, SI-RNTI (system information-RNTI) may be masked to the CRC. In order to indicate a random access response being a response to transmission of the random access preamble, RA-RNTI (random access-RNTI) may be masked to the CRC. So as to indicate a TPC (transmit power control) command with respect to a plurality of wireless devices, TPC-RNTI may be masked to the CRC. In a PDCCH for semi-persistent scheduling (SPS), SPS-C-RNTI may be masked to the CRC. The SPS will be describer later.

If C-RNTI series (for example, C-RNTI, SPS-C-RNTI, Temporary C-RNTI) are used, the PDCCH transfer control information (refers to UE-specific control information) for a corresponding specific wireless device. If other RNTI is used, the PDCCH transfers common control information received by all or a plurality of wireless devices in a cell.

A DCI to which the CRC is added is encoded to generate coded data. Encoding includes channel encoding and rat matching. The coded data are modulated to generate modulated symbols. The modulated symbols are mapped to a physical RE (resource element).

The control region in the subframe includes a plurality of control channel elements (CCEs). The CCE is a logical allocation unit used to provide a coding rate according to a state of a wireless channel to the PDCCH, and corresponds to a plurality of resource element groups (REGs). The REG includes a plurality of resource elements (REs). According to the relationship between the number of CCEs and a coding rate provided by the CCEs, a format of the PDCCH and the bit number of possible PDCCHs are determined.

One REG includes four REs, and one CCE includes 9 REGs. In order to configure one PDCCH, {1, 2, 4, 8} CCE may be used. Each element of {1, 2, 4, 8} refers to a CCE aggregation level.

The base station determines the number of CCEs used to transmit the PDDCH is determined according to a channel state. For example, one CCE may be used to transmit the PDCCH in a wireless device having an excellent downlink channel state. 8 CCEs may be used to transmit the PDCCH in a wireless device having a poor downlink channel state.

A control channel configured by one or more CCEs performs interleaving of an REG unit, and is mapped to a physical resource after cyclic shift base a cell ID is performed.

Figure 5:
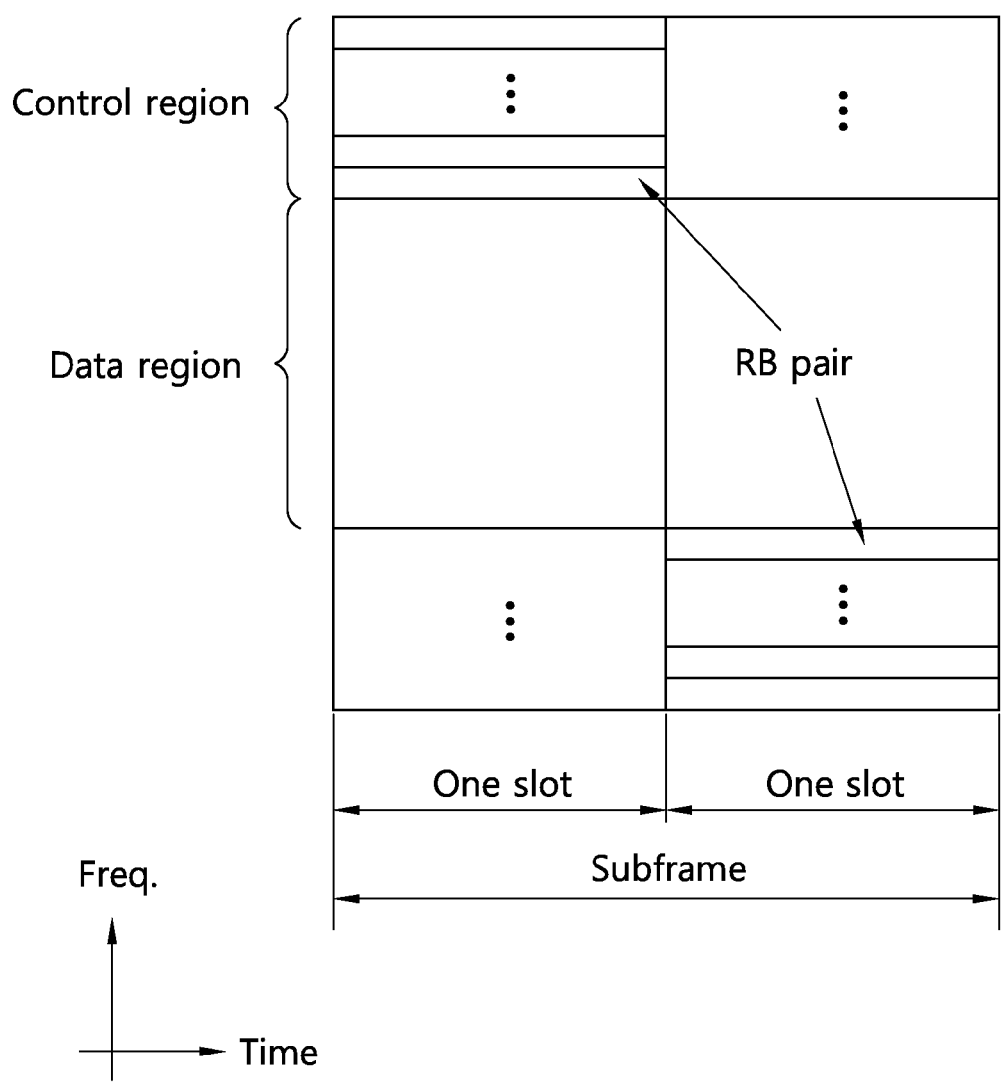
FIG. 5 illustrates an uplink subframe.

FIG. 5 illustrates an uplink subframe.

Referring to FIG. 5, the uplink subframe may be divided into a control region and a data region in a frequency region. A PUCCH (Physical Uplink Control Channel) for transmitting uplink control information is allocated to the control region. A PUSCH (Physical Uplink Shared Channel) for transmitting data (control information may be transmitted together with the data in some cases) is allocated to the data region. The UE may simultaneously transmit the PUCCH and the PUSCH or may transmit only one of the PUCCH and the PUSCH according to setting.

The PUCCH with respect to one UE is allocated as a RB pair in a subframe. RBs belonging to the RB pair have different sub-carriers in a first slot and a second slot, respectively. A frequency of an RB belonging to the RB pair allocated to the PUCCH is changed based on a slot boundary. This means that a frequency of an RB pair allocated to the PUCCH is hopped in a slot boundary. The uplink control information is transmitted through different sub-carriers according to a time so that a frequency diversity gain may be obtained.

HARQ ACK/NACK (hereinafter simply referred to as 'ACK/NACK' or 'HARQ-ACK), channel status information (CSI) representing a downlink channel state, for example, a CQI (Channel Quality Indicator), a PMI (precoding matrix index), a PTI (precoding type indicator), an RI (rank indication), and the like may be transmitted on the PUCCH.

The CQI provides information on a link adaptive parameter supported from the UE with respect to a given time. The CQI may indicate a data rate which may be supported by a downlink channel by taking a characteristic and an SINR (signal to interference plus noise ratio) of a UE receiver into consideration. The base station may modulation (QPSK, 16-QAM, 64-QAM, and the like) and a coding rate to be applied to downlink channel using a CQI. The CQI may be generated in various schemes. For example, the various schemes include a scheme to quantize and feedback a channel state as it is, a scheme to calculate and feedback the SINR (signal to interference plus noise ratio), and a scheme such as an MCS (Modulation Coding Scheme) to report a really applied state to the channel. When the CQI is generated based on the MCS, the MCS includes a modulation scheme, and a coding scheme, and a coding rate according thereto.

The PMI provides information on a precoding matrix in pre-coding of a code-book base. The PMI is associated with an MIMO (multiple input multiple output). Feedback of the PMI in the MIMO refers to a closed loop MIMO.

An RI is information on a rank (that is, the number of layers) recommended by the UE. That is, the RI represents the number of independent streams used for space multiplexing. Only when the UE is operated in an MIMO mode using the space multiplexing, the RI performs feedback. The RI is always associated with at least one CQI feedback. The feedback CQI is calculated by assuming a specific RI value. In general, since the rank of the channel is changed slower than the CQI, the RI performs feedback less than the feedback number of the CQI. A transmission period of the RI may be a multiple of CQI/PMI transmission period. The RI is given with respect to the whole system band, and a selective frequency RI feedback is not supported.

The PUCCH transfers various types of control information according to a format. The PUCCH format 1 transfers a scheduling request (SR). In this case, an On-Off Keying (OOK) scheme is applicable. A PUCCH format 1a transfers ACK/NACK modulated in a Binary Phase Shift Keying (BPSK) scheme with respect to one code-word. A PUCCH format 1b transfers the ACK/NACK modulated in a Quadrature Phase Shift Keying (QPSK) scheme with respect to two code-words. A PUCCH format 2 transfers a Channel Quality Indicator (CQI) modulated in the QPSK scheme. PUCCH formats 2a and 2b transfer the CQI and the ACK/NACK, respectively.

The PUCCH format may be classified according to a modulation scheme and the number of transmittable bits per subframe. A following table indicates the modulation scheme and the number of bits in the subframe.

TABLE 2

| PUCCH format | Modulation scheme | The number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

All PUCCH formats use cyclic shift (CS) of a shift in each OFDM symbol. The cyclic shifted sequence is generated by cyclically shifting a base sequence by a specific CS amount. A specific CS amount is indicated by a CS index.

An example of defining a base sequence $r_u(n)$ is as follows.

$$r_u(n) = e^{jb(n)\pi/4}$$ [Equation 1]

In the equation 1, the u represents a root index, the n represents an element index and $0 \le n \le N-1$, and the N is a length of the base sequence. The b(n) is defined in a section 5.5 of 3GPP TS 36.211 V8.7.0.

The length of the sequence is the same as the number of elements included in the sequence. The u may be defined by a cell ID (identifier) and a slot number in the radio frame. When the base sequence is mapped to one resource block in a frequency domain, since one resource block include 12 sub-carriers, the length of the base sequence is 12. Other base sequence is defined according to other root index.

A cyclic shifted sequence $r(n, I_{cs})$ may be generated by cyclically shifting the root sequence r(n) as follows.

$$r(n, I_{cs}) = r(n) \cdot \exp\left(\frac{j2\pi I_{cs} n}{N}\right), 0 \le I_{cs} \le N-1$$ [Equation 2]

In equation 2, the $I_{cs}$ represents a cyclic shift index ($0 \le I_{cs} \le N-1$) indicating a CS amount.

An available cyclic shift index of the base sequence means a cyclic shift index which may be derived from the base sequence according to a CS interval. For example, if the length of the base sequence is 12 and the CS interval is 1, the total number of available cyclic shift indexes of the base sequence is 12. Further, if the length of the base sequence is 12 and the CS interval is 2, the total number of available cyclic shift indexes of the base sequence is 6.

Figure 6:
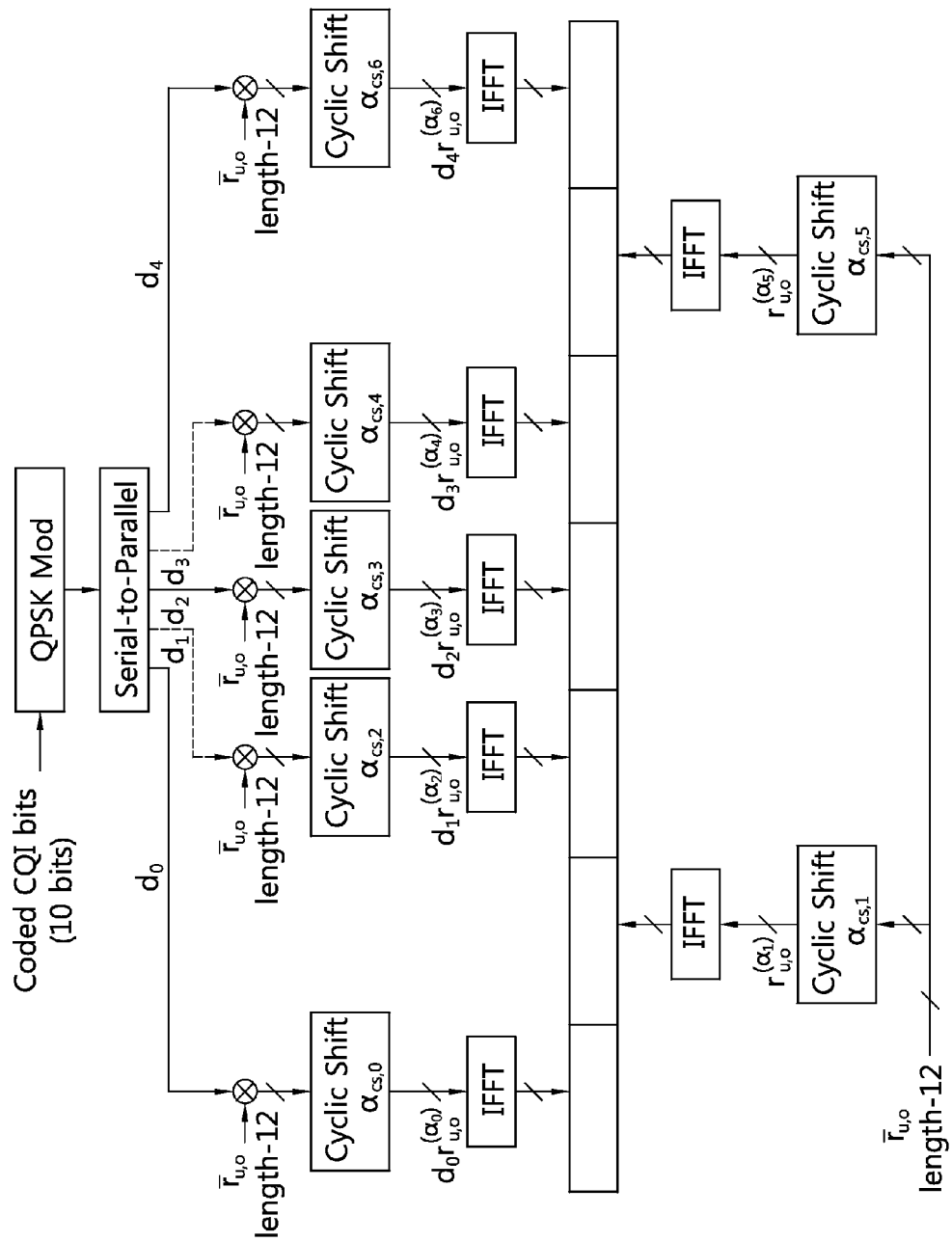
FIG. 6 illustrates a channel structure of a PUCCH format 2/2a/2b with respect to one slot in a normal CP.

FIG. 6 illustrates a channel structure of a PUCCH format 2/2a/2b with respect to one slot in a normal CP. As described above, the PUCCH format 2/2a/2b is used to transmit a CQI.

Referring to FIG. 6, SC-FDMA symbols 1 and 5 are used for a DM RS (demodulation reference symbol) which is a uplink reference signal. In a case of the CP, an SC-FDMA (single carrier-frequency division multiple access) symbol 3 is used for a DM RS.

10 CQI information bits are channel-coded with, for example, a 1/2 rate to be 20 coded bits. A Reed-Muller (RM) may be used for the channel coding. Further, after scrambling (PUSCH data is scrambled to a gold sequence having a length 31), a QPSK constellation mapping is performed so that a QPSK modulation symbol is generated ($d_0$ to $d_4$ in a slot 0). After each QPSK modulation symbol is modulated to a cyclic shift of a base RS sequence having a length 12 and is OFDM-modulated, 10 SC-FDMA symbols in a subframe are transmitted. 12 uniformly spaced cyclic shifts may be multiplexed so that different UEs are orthogonal to each other in the same PUCCH resource block. A DM RS sequence applied to the SC-FDMA symbols 1 and 5 may use a base RS sequence having a length 12.

Figure 7:
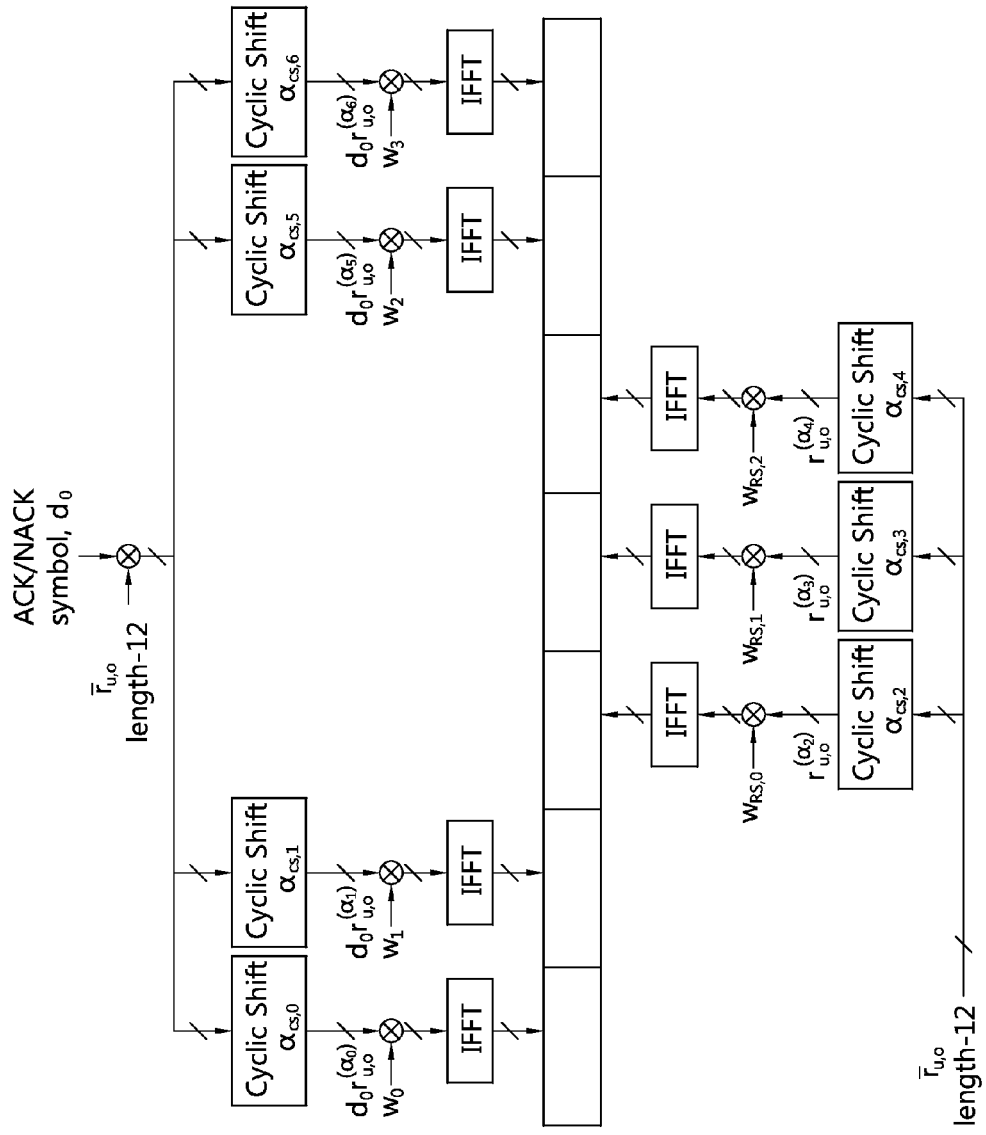
FIG. 7 illustrates a PUCCH format 1a/1b with respect to one slot in a normal CP.

FIG. 7 illustrates a PUCCH format 1a/1b with respect to one slot in a normal CP. A uplink reference signal is transmitted in third to fifth SC-FDMA symbols. In FIG. 7, after IFFT (Inverse Fast Fourier Transform) for $w_0$, $w_1$, $w_2$, and $w_3$ is performed, the $w_0$, $w_1$, $w_2$, and $w_3$ may be modulated in a time domain and may be modulated in a frequency domain before IFFT modulation.

One symbol includes seven OFDM symbols, 3 OFDM symbols become an RS (Reference Signal) OFDM symbol for a reference signal, and 4 OFDM symbols become a data OFDM symbol for ACK/NACK signals.

In a PUCCH format 1b, encoded 2 bit ACK/NACK signals are QPSK (Quadrature Phase Shift Keying)-modulated so that a modulation symbol d(0) is generated.

A cyclic shift index $I_{cs}$ may be changed according to a slot number $n_s$ in a radio frame and/or a symbol index l in a slot.

Since there are 4 data OFDM symbols to transmit ACK/NACK signals to one slot in a normal CP, it is assumed that cyclic shift indexes corresponding to each data OFDM symbol are $I_{cs0}$, $I_{cs1}$, $I_{cs2}$, and $I_{cs3}$.

A modulation symbol d(0) is extended to a cyclic shifted sequence $r(n, I_{cs})$. If one dimensional spread sequence corresponding to an (i+1)-th OFDM symbol in the slot is m(i), $$\{m(0), m(1), m(2), m(3)\} = \{d(0)r(n, I_{cs0}), d(0)r(n, I_{cs1}), d(0)r(n, I_{cs2}), d(0)r(n, I_{cs3})\}.$$

In order to increase a capacity of the UE, the one dimensional spread sequence may be spread using an orthogonal sequence. An orthogonal sequence $w_i(k)$ (I represents a sequence index, $0 \le k \le K-1$) having spreading factor K=4 uses a following sequence.

TABLE 3

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

An orthogonal sequence $w_i(k)$ (i represents a sequence index, $0 \le k \le K-1$) having spreading factor K=3 uses a following sequence.

TABLE 4

| Index (i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

Different spreading coefficients may be used according to the slot.

Accordingly, when an optional orthogonal sequence index i is given, two dimensional spread sequences {s(0), s(1), s(2), s(3)} may be expressed as follows.

$$\{s(0),s(1),s(2),s(3)\}=\{w_i(0)m(0),w_i(1)m(1),w_i(2)m(2),w_i(3)m(3)\}$$

After an IFFT for the two dimensional sequences {s(0), s(1), s(2), s(3)} is performed, the sequences are transmitted in a corresponding OFDM symbol. Accordingly, the ACK/NACK signals are transmitted on a PUCCH.

A reference signal of a PUCCH format 1b is spread and transmitted as an orthogonal sequence after cyclically shifting the base sequence r(n). If cyclic shift indexes corresponding to three RS OFDM symbols are $I_{cs4}$, $I_{cs5}$, and $I_{cs6}$, three cyclic shifted sequences $r(n,I_{cs4})$, $r(n,I_{cs5})$, $r(n,I_{cs6})$ may be obtained. The three cyclic shifted sequence are spread to an orthogonal sequence $w_{RS,i}(k)$ of K=3.

The orthogonal sequence index i, the cyclic shift index $I_{cs}$ and the resource block index m may include a parameter necessary to configure the PUCCH and a resource used to identify the PUCCH (or UE). If the number of available cyclic shifts is 12 and the number of available orthogonal sequence indexes is 3, a PUCCH with respect to 36 UEs may be multiplexed to one resource block.

In the 3GPP LTE, $n^{(1)}_{PUCCH}$ is defined when the UE acquires three parameters to configure the PUCCH. A resource index is defined as $n^{(1)}_{PUCCH}=n_{CCE}+N^{(1)}_{PUCCH}$. The $n_{CCE}$ represents an index of a first CCE (CCE having the lowest index) used to transmit a corresponding DCI (that is, downlink resource allocation to receive downlink data being a target of the ACK/NACK signals), and $N^{(1)}_{PUCCH}$ represents where the base station reports to the UE as a higher layer message.

Hereinafter, a time, a frequency, and a code resource used to transmit the ACK/NACK signals refer to ACK/NACK resources or PUCCH resources. As described above, an index to determine the PUCCH resource (refer to PUCCH index), that is, an index necessary to transmit ACK/NACK signals on a PUCCH may be expressed by at least one of {orthogonal sequence index i, cyclic shift index $I_{cs}$, resource block index m} or an index ($n^{(1)}_{PUCCH}$) to obtain the three indexes. That is, the PUCCH resource may include at least one of an orthogonal sequence, a cyclic shift, a resource block, and a combination thereof. The index indicating the PUCCH resource may refer to a PUCCH index.

Meanwhile, in an LTE-A, a PUCCH format 3 is introduced to transmit uplink control information (for example, ACK/NACK and SR) of maximum 21 bits (the number of bits before channel coding as information bit, maximum 22 bits when an SR is included). The PUCCH format 3 uses a QPSK in a modulation scheme, and the number of transmittable bits in a subframe is 48 bits).

The PUCCH format 3 performs block spreading based transmission. A modulation symbol sequence obtained by modulating a multi-bit ACK/NACK using a block spreading code.

Figure 8:
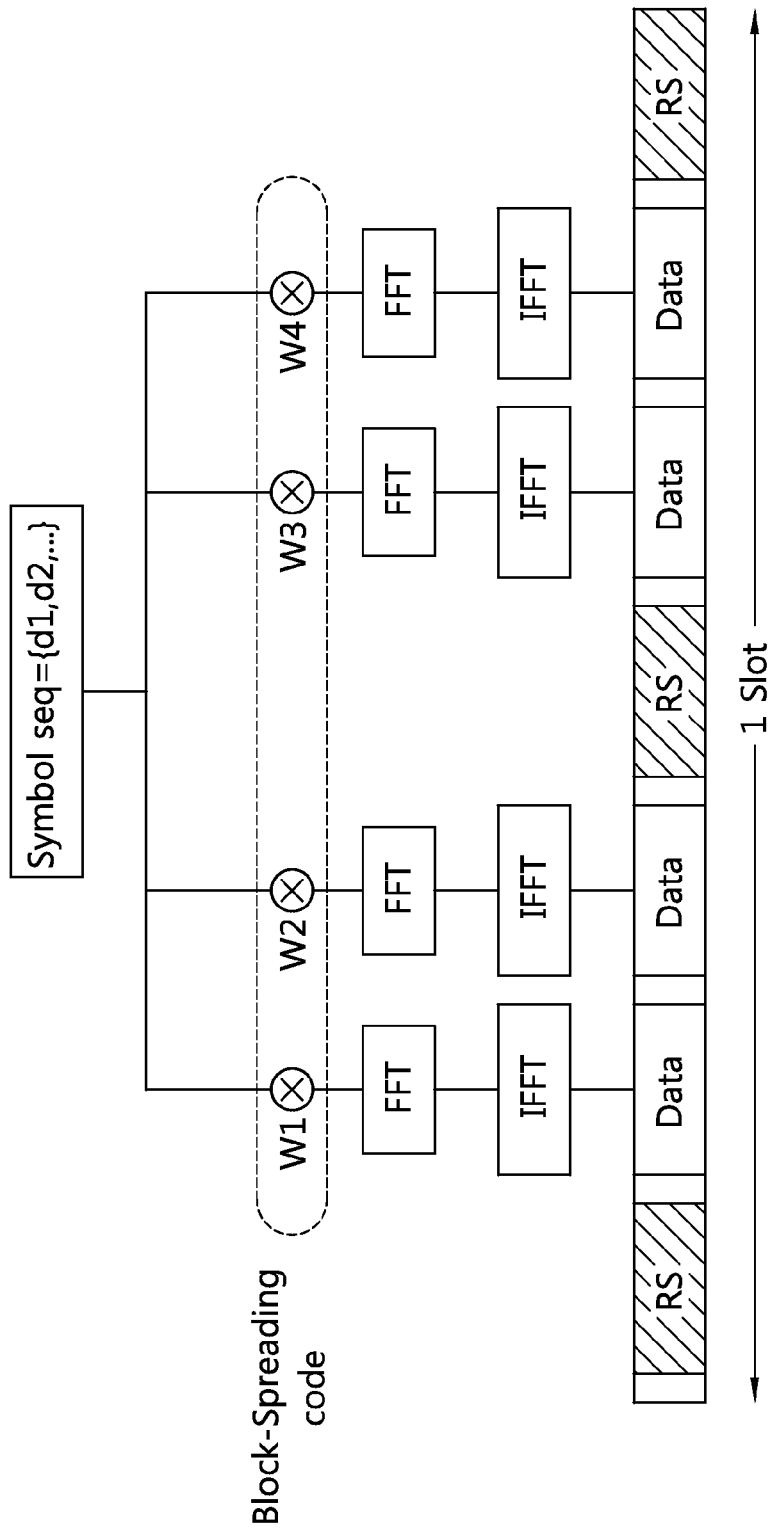
FIG. 8 illustrates a channel structure of a PUCCH format 3.

FIG. 8 illustrates a channel structure of a PUCCH format 3.

Referring to FIG. 8, a block spreading code is applied to a modulation symbol sequence {d1, d2, . . . } and is spread in a time domain. The block spreading code may include an orthogonal cover code (OCC). In this case, in the modulation symbol sequence, ACK/NACK information bits are channel-coded (using RM code, TBCC, punctured RM code) so that ACK/NACK coded bits are generated, the ACK/NACK coded bits are a sequence of modulated (for example, QPSK) symbols. The sequence of the modulation symbols is mapped to data symbols of a slot through FFT (fast Fourier transform) and IFFT (inverse fast Fourier transform) to be transmitted. Although FIG. 8 illustrates that three RS symbols are included in one slot, two RS symbol may exist. In this case, a block spreading code of a length 5 may be used.

<Semi-Persistent Scheduling: SPS>

In the wireless communication system, the UE receives scheduling information such as DL grant and UL grant through a PDCCH to perform an operation of transmitting the PUSCH. In general, the DL grant and the PDSCH are received in the same subframe. Further, in a case of the FDD, the PUSCH is transmitted after fourth subframes from a subframe receiving the UL grant. An LTE except for the dynamic scheduling provides semi-persistent scheduling (SPS).

Downlink or uplink SPS may report by which subframe semi-static transmission (PUSCH)/reception (PDSCH) is performed to the UE through a higher layer signal. For example, a parameter give as the higher layer signal may be a period and an offset value of the subframe.

The UE recognizes SPS transmission/reception through RRC signaling. If receiving activation and release signal of SPS transmission through the PDCCH, the UE performs or releases SPS transmission/reception. That is, although an SPS is allocated through RRC signaling, when SPS transmission/reception are not performed but the activation or release signal is received through the PDCCH, frequency resource (resource block) according to a resource block allocation designated in the PDCCH and modulation and a coding rate according to MCS information are applied so that SPS transmission/reception are performed in a subframe corresponding to a subframe period and an offset value allocated through RRC signaling. If an SPS release signal is received through the PDSSH, SPS transmission/reception stop. If a PDCCH (SPS reactivation PDCCH) including an SPS activation signal is again received, the stopped SPS transmission/reception restarts using a frequency resource and an MCS designated by a corresponding PDCCH.

Hereinafter, a PDCCH for SPS activation refers to an SPS activation PDCCH, and a PDCCH for SPS release refers to an SPS release PDCCH. The UE may validate whether the PDCCH is SPS activation/release PDCCH when following conditions are satisfied. 1. CRC parity bits obtained from a PDCCH payload are scrambled to SPS C-RNTI, and 2. A value of new data indicator field should be '0'. Further, if each filed value included in the PDCCH is set as values of a following table, the UE recognizes that downlink control information (DCI) of a corresponding PDCCH is SPS activation or release.

TABLE 5

| | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |

TABLE 5-continued

|  | DCI format 0 | DCI format 1/1A | DCI format 2/2A/2B |
|---|---|---|---|
| Modulation and coding scheme | N/A | MSB is set to '0' | For the enabled transport block: MSB is set to '0' |
| Redundancy version | N/A | set to '00' | For the enabled transport block: set to '00' |

The table 5 indicates a filed value of an SPS activation PDCCH to validate SPS activation.

TABLE 6

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

The table 6 indicates a field value of an SPS release PDCCH to validate the SPS release.

By the SPS, a PDCCH indicating an SPS activation and a PDSCH transmitted from the same subframe has a corresponding PDCCH (that is, PDCCH indicating SPS activation), a next PDSCH, that is, by the SPS, a next scheduled PDSCH (refer to SPS PDSCH) does not have a corresponding PDCCH. Accordingly, when transmitting ACK/NACK with respect to the SPS PDSCH, it is impossible to use a PUCCH resource mapped to the lowest CCE index of the PDCCH.

Accordingly, the base station previously sets a plurality of resources through a higher layer signal like an RRC message, and then uses a TPC field included in a PDCCH indicating SPS activation as an ARI (ACK/NACK resource indicator) to indicate ACK/NACK transmission resources with respect to SPS PDSCH in a scheme of indicating a specific resource among a plurality of resources. Such ACK/NACK transmission resources may refer to an explicit resource.

<HARQ (Hybrid Automatic Repeat Request)>

Upon transmission/reception of data between the base station and the UE, when the frame is not received or damaged, an error control method includes an ARQ (Automatic Repeat request) scheme and a HARQ (hybrid ARQ) scheme which is a developed scheme thereof. In the ARG scheme, after one frame is transmitted, a confirmation message ACK is waited for. Only when a reception side exactly receives the frame, the reception side sends the confirmation message ACK. When an error occurs in the frame, the reception side sends a NACK (negative-ACK) message, and a reception frame with the error removes the information in a receiving end buffer. When the transmission side receives the ACK signal, the transmission side transmits a next frame. When receive the NACK message, the transmission side retransmits the frame.

Unlike the ARG scheme, according to the HARQ scheme, when the received frame cannot be demodulated, a receiving end transmits an NACK message to the transmitting end. However, when the received frame is stored in the buffer for a predetermined time so that the frame is retransmitted, the frame is coupled with the received frame so that a reception success rate is increased.

In recent years, more efficient HARQ scheme than the ARQ scheme may be widely used. There are various types of HARQ schemes. The HARQ scheme may be divided into synchronous HARQ and asynchronous HARQ according to retransmission timing. The HARQ scheme may be divided into a channel-adaptive scheme and a channel-non-adaptive scheme according to presence of reflection of a channel state with respect to an amount of a resource used upon retransmission.

Figure 9:
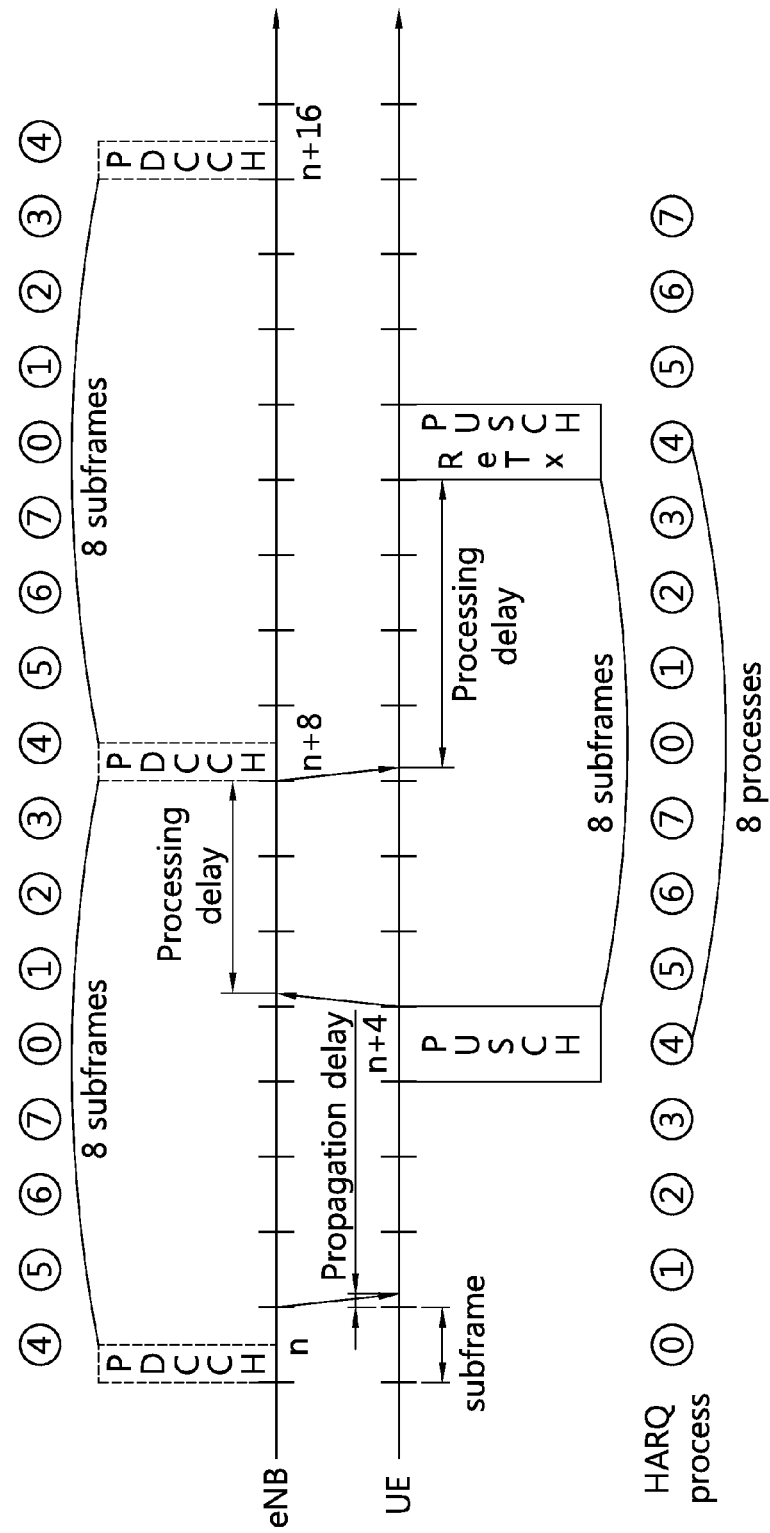
FIG. 9 illustrates a synchronization HARQ.

FIG. 9 illustrates a synchronization HARQ.

The synchronization HARQ is a scheme where next retransmission is achieved at preset timing by a system. That is, if it is assumed that the time of the retransmission is achieved an 8-th time unit after initial transmission, since the engagement is achieved between the base station and the UE, it is not necessary to additionally report the timing. However, if the data transmission side receives an NACK message, data are transmitted in every 8-th time unit in order to receive the ACK message.

Meanwhile, retransmission timing of the asynchronization HARQ scheme is newly scheduled or the asynchronization HARQ scheme may be achieved through additional signaling. Retransmission timing with respect to data in which transmission previously fails is changed due to various factors such as a channel state.

A channel non-adaptive HARQ scheme is a scheme where modulation of data, the number of resource blocks, and a coding scheme upon retransmission are achieved in an order determined in initial transmission. Meanwhile, in the channel adaptive HARQ scheme is a scheme where the modulation of data, the number of resource blocks, and a coding scheme are changed according to a state of the channel.

For example, the transmission side transmits data using 6 resource blocks upon initial transmission. Next, a scheme of equally retransmitting the data using 6 resource blocks is a channel non-adaptive HARQ scheme.

Meanwhile, a scheme of retransmitting data using resource blocks greater or less than 6 according to a channel state although the data are initially transmitted using 6 resource blocks is a channel adaptive HARQ scheme.

Four types of HARQs may be combined through the above classification. A widely used HARQ scheme includes asynchronization and channel adaptive HARQ scheme and synchronization and channel non-adaptive HARQ scheme. Since the asynchronization and channel adaptive HARQ scheme may maximize retransmission efficiency by adaptively changing retransmission timing and an amount of a resource but overhead is increased, the asynchronization and channel adaptive HARQ scheme is not generally considered for uplink. Meanwhile, since the synchronization and channel adaptive HARQ does not substantially have overhead because timing and resource allocation for retransmission are engaged in the system, overhead is rare, but retransmission efficiency is very lower in a channel state having great variation.

In downlink in a current 3GPP LTE, the asynchronization HARQ scheme is used. In uplink case, the synchronization HARQ scheme is used.

Meanwhile, as an example of the downlink, until the data is scheduled and transmitted and then the ACK/NACK signal is received from the user equipment and the next data is transmitted again, a time delay occurs as illustrated in FIG. 9. This is a delay which occurs due to a propagation delay of the channel and a time required for data decoding and data coding. A method has been used, which transmits data by using an independent HARQ process, in order to prevent a gap of data transmission from being risen during a delay interval.

For example, when a shortest period from the data transmission to the next data transmission in one HARQ process is eight subframes, the data may be transmitted without the blank by providing eight independent HARQ processes. In LTE FDD, in the case of not operating in the MIMO, a maximum of eight HARQ processes may be assigned.

<Carrier Aggregation>

Hereinafter, the carrier aggregation system will be described.

Figure 10:
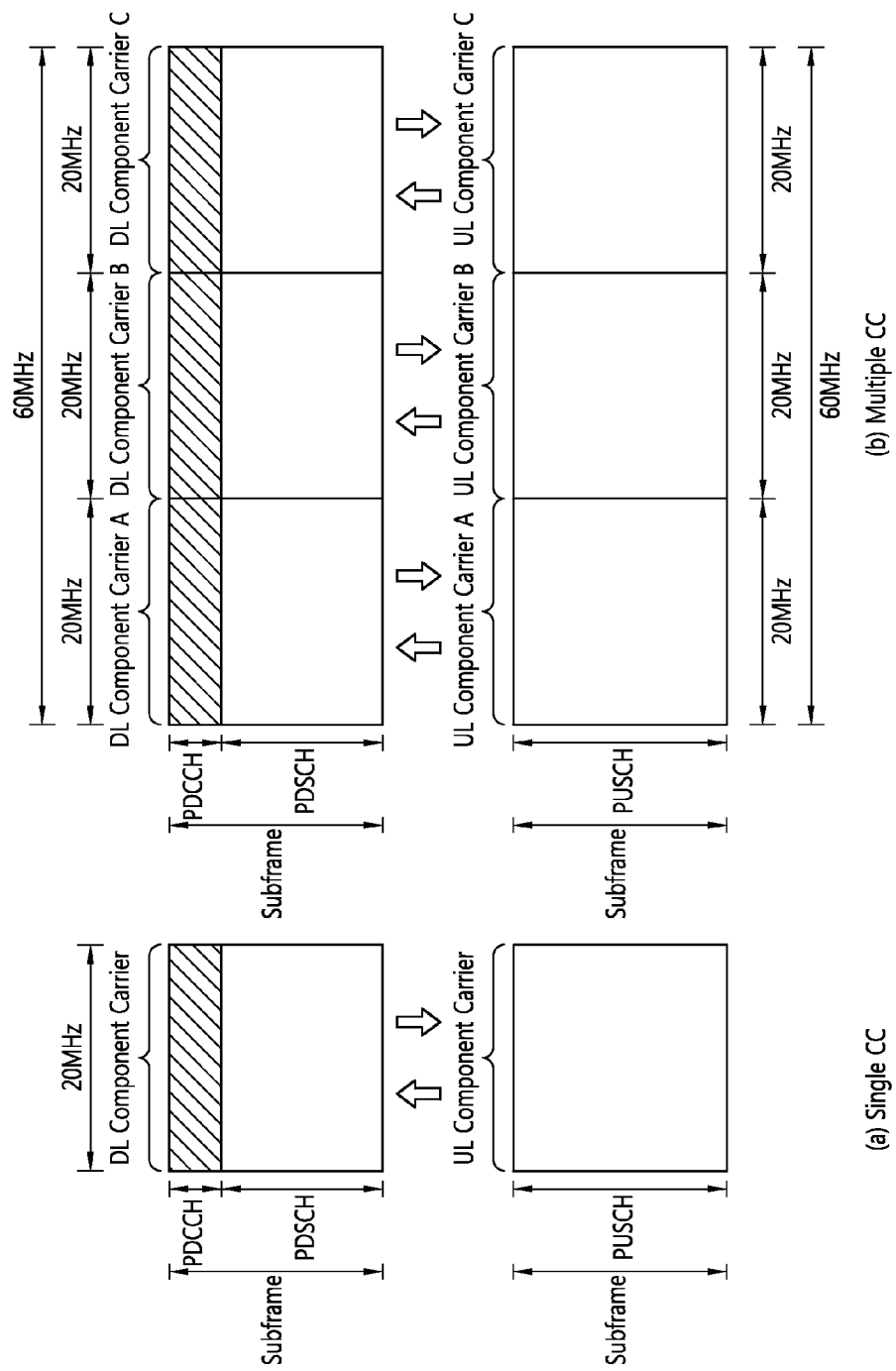
FIGS. 10(a) and 10(b) illustrate an example of comparing an existing single carrier system and a carrier aggregation system.

FIG. 10 illustrates an example of comparing an existing single carrier system and a carrier aggregation system.

Referring to FIG. 10, in a single carrier system, only one carrier is supported to the UE in uplink and downlink. Although there may be various bandwidths of the carrier, one carrier is allocated to the UE. Meanwhile, in the CA system, a plurality of component carriers (DL CC A to C, UL CC A to C). The component carrier (CC) means a carrier used for the CA system and may refer to a carrier. For example, in order to allocate a bandwidth of 60 MHz to the UE, 3 component carriers of 20 MHz may be allocated.

The CA system may be classified into a continuous CA system where aggregated carriers continue and a non-continuous CA system where the aggregated carriers are spaced apart from each other. Hereinafter, it is understood that the CA system includes all of a case of a continuous component carrier and a case of a non-continuous component carrier.

A system frequency band of the wireless communication system is classified into a plurality of carrier-frequencies. The carrier frequency means a center frequency of a cell. Hereinafter, the cell may mean a downlink frequency resource and an uplink frequency resource. Alternatively, the cell may mean a combination of the downlink frequency resource and an optional uplink frequency resource. Further, generally, when the CA is not considered, one cell may include a pair of uplink and downlink frequency resources.

In order to transmit/receive packet data through the specific cell, the UE should finish configuration with specific cell. In this case, the configuration means a state of finishing reception of system information necessary to transmit/receive data with respect to a corresponding cell. For example, the configuration may include the whole procedure to receive common physical layer parameters necessary to transmit/receive data, or MAC (media access control) layer parameters, or parameters necessary for a specific operation at an RRC layer. If a cell in which the configuration is terminated receives only information indicating that packet data may be transmitted, the cell may transmit and receive a packet at once.

The cell in which the configuration is terminated may be in an activation state or a deactivation state. In this case, the activation means that data are transmitted or received or transmission or reception of the data in a ready state. The UE may monitor or receive a control channel PDCCH and a data channel PDSCH of an activated cell in order to confirm resources (frequency, time, or the like) allocated to the UE.

The deactivation means that transmission or reception of traffic data is impossible and measurement or transmission/reception of minimum information is possible. The UE may receive system information SI necessary to receive a packet from a deactivated cell. Meanwhile, the UE does not monitor or receive a control channel PDCCH and a data channel PDSCH of the deactivated cell in order to confirm resources (frequency, time, or the like).

The cell may be classified into a primary cell, a secondary cell, and a serving cell.

The primary cell means a cell operating at a primary frequency, and means a cell performing initial connection establishment procedure or connection reestablishment procedure with the base station or a cell indicated as a primary cell at a handover procedure.

The secondary cell means a cell operating in a secondary cell. If RRC connection is established, the secondary cell is used to provide an additional preset wireless resource.

In a case of UE in which the CA is not set or does not provide the CA, the serving cell is configured by the primary cell. When the carrier aggregation is set, the term 'serving cell' represents a cell set to the UE and a plurality of serving cell may be configured. One serving cell may be configured by one downlink component carrier or a pair of {downlink component carrier, uplink component carrier}. A plurality of serving cells may be configured by a primary cell and one secondary cell or a plurality of secondary cells.

A PCC (primary component carrier) signifies a component carrier (CC) corresponding to a primary cell. The PCC is a CC where the UE initially achieves connection or RRC connection with the base station among a plurality of CCs. The PCC is a special CC to provide connection or RRC connection for signaling regarding a plurality of CC, and to manage UE context which is connection information associated with the UE. Further, when the PCC accesses the UE in an RRC connection mode, the PCC is always in an active state. A downlink component carrier corresponding to the primary cell refers to a DownLink Primary Component Carrier (DL PCC) and an uplink component carrier corresponding to the primary cell refers to an uplink primary component carrier (UL PCC).

The SCC (secondary component carrier) means a CC corresponding to the secondary cell. That is, the SCC is a CC allocated to the UE except for a PCC. The SCC is an extended carrier when the UE selects for additional resource allocation except for the PCC, and may be divided into a activation state or a deactivation state. A downlink component carrier corresponding to the secondary cell refers to a DownLink secondary Component Carrier (DL SCC) and an uplink component carrier corresponding to the second cell refers to an uplink secondary component carrier (UL SCC).

The primary cell and the secondary cell have following characteristics.

First, the primary cell is used to transmit the PUCCH. Second, the primary cell is always activated, but the second cell is a carrier which is activated/deactivated according to a specific condition. Third, when the primary cell experiences a Radio Link Failure (hereinafter referred to as 'RLF'). Fourth, the primary cell may be changed according to variation in a security key, a RACH (Random Access CHannel) procedure, and an accompanying handover procedure. Fifth, NAS (non-access stratum) information is received through the primary cell. Sixth, in a case of an FDD system, the primary cell always configures a pair of the DL PCC and the UL PCC. Seventh, different component carriers CCs may be set as the primary cell every UE. Eighth, the primary cell may be replaced by only handover, cell selection/cell reselection procedures. In addition of a new secondary cell, RRC signal may be used to transmit system information of a dedicated secondary cell.

In a component carrier configuring the serving cell, the downlink component carrier may configure one serving cell, or the downlink component carrier and the uplink component carrier are connected and configured so that one serving cell may be configured. However, the serving cell may not be configured by only one uplink component carrier.

Activation/deactivation of the component carrier is similar to concept of activation/deactivation of the serving cell. For example, activation of the serving cell 1 means activation of the DL CC1 on the assumption that the serving cell 1 is configured by a DL CC1. If the activation of the serving cell 2 means activation of a DL CC2 and the UL CC2 on the assumption that the serving cell 2 is configured by connecting and configuring a DL CC2 and a UL CC2. In this meaning, each component carrier may correspond to a serving cell.

The number of component carriers aggregated between downlink and uplink may be differently set. When the number of CCs in the downlink is the same as the number of CCs in the uplink, the aggregation is symmetric. When the number of CCs in the downlink is different from the number of CCs in the uplink, the aggregation is asymmetric. Further, the sizes (that is, bandwidths) of the CCs may be different from each other. For example, when five CCs is used to configure 70 MHz band, 5 MHz CC(carrier #0)+20 MHz CC(carrier #1)+20 MHz CC(carrier #2)+20 MHz CC(carrier #3)+5 MHz CC(carrier #4) may be configured.

As described above, the CA system may support a plurality of CCs, that is, a plurality of serving cells unlike the single carrier system.

Such a CA system may support cross-carrier scheduling. The cross-carrier scheduling is a scheduling method capable of performing resource allocation of a PDSCH transmitted through a different component carrier through a PDCCH transmitted through a specific component carrier and/or resource allocation of a PUSCH transmitted through other component carrier except for a component carrier fundamentally linked with the specific component carrier. That is, the PDCCH and the PDSCH may be transmitted through different DL CCs, a PUSCH may be transmitted through a UL CC different from a UL CC liked with a DL CC to which a PDCCH including an UL is transmitted. As described above, in a system for supporting the cross-carrier scheduling, the PDCCH needs a carrier indicator indicating that PDSCH/PUSCH are transmitted through a certain DL CC/UL CC. Hereinafter, a field including the carrier indicator refers to a carrier indication field (CIF).

A CA system to support the cross-carrier scheduling may include a carrier indicator field (CIF) included in a DCI (downlink control information) format according to the related art. In the system to support the cross-carrier scheduling, for example, an LTE-A system, since a CIF is added to an existing DCI format (that is, a DCI format used in an LTE), 3 bits may be spread, and a PDCCH structure may reuse an existing coding method, a resource allocation method (that is, a CCE based resource mapping).

The base station may set a PDCCH monitoring DL CC (monitoring CC) group. The PDCCH monitoring DL CC group is configured by a part of all aggregated DL CCs. If the cross-carrier scheduling is configured, the UE performs PDCCH monitoring/decoding for only a DL CC included in the PDCCH monitoring DL CC group. That is, the base station transmits a PDCCH with respect to PDSCH/PUSCH to be scheduled through only the DL CCs included in the PDCCH monitoring DL CC group. The PDCCH monitoring DL CC group may be configured to UE-specific, UE group-specific, or cell-specific.

<ACK/NACK Transmission Method in HARQ Process>
Hereinafter, ACK/NACK transmission for HARQ in 3GPP LTE will be described.

In FDD, a user equipment for supporting aggregation for a maximum of two serving cells transmits ACK/NACK by using PUCCH format 1b with channel selection when two serving cells are configured.

The user equipment for supporting aggregation of two or more serving cells transmits the ACK/NACK by using the PUCCH format 1b or the PUCCH format 3 with the channel selection according to configuration of a higher-layer signal when two or more serving cells are configured. The PUCCH format 1b with the channel selection will be described below.

In TDD, the DL subframe and the UL subframe coexist in one radio frame unlike the frequency division duplex (FDD). In general, the number of UL subframes is smaller than the number of DL subframes. Accordingly, against insufficient UL subframes for transmitting the ACK/NACK signal, it is supported that a plurality of ACK/NACK signals for downlink data (that is, a plurality of PDSCHs) received in the plurality of DL subframes is transmitted in one UL subframe.

In the TDD, a user equipment that does not support the aggregation of two or more serving cells two ACK/NACK modes of bundling and channel selection are supported according to a configuration of a higher layer.

First, the bundling transmits ACK when the UE succeeds all decoding of a received PDSCH (that is, downlink transmission blocks) and transmits NACK in remaining cases. This refers to an AND operation. However, the bundling is not limited to the AND operation but may include various operations to compress ACK/NACK bits corresponding to a plurality of transmission blocks (or code-words). For example, the bundling may indicate a value counting the number of ACKs (or NACKs) or the number of continuous ACKs.

Second, the channel selection refers to ACK/NACK multiplexing. In the channel selection, the UE selects one from a plurality of PUCCH resources to transmit ACK/NACK to the selected PUCCH resource.

A following table is an example of a DL subframe n-k associated with an UL subframe n according to UL-DL configuration in the 3GPP LTE. In this case, keK, and the M represents the number of components of a group K.

TABLE 7

| UL-DL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

M=3 is considered on the assumption that M DL subframes are connected to a UL subframe n. Three PDCCHs may be received from three DL subframes, and the UE may acquire 3 PUCCH resources ($n^{(1)}_{PUCCH,0}$, $n^{(1)}_{PUCCH,1}$, $n^{(1)}_{PUCCH,2}$). An example of the channel selection in the TDD is as follows.

TABLE 8

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

In the table 8, HARQ-ACK(i) represents ACK/NACK with respect to an i-th downlink subframe among M downlink subframes. DTX (DTX(Discontinuous Transmission) means that a DL transmission block is not received on a PDSCH in a corresponding DL subframe or a corresponding PDCCH is not detected. According to the above table 8, there are 3 PUCCH resources ($n^{(1)}_{PUCCH,0}$, $n^{(1)}_{PUCCH,1}$, $n^{(1)}_{PUCCH,2}$), and b(0) and b(1) are two bits transmitted using a selected PUCCH.

For example, if the UE successively receives all of the three DL transmission blocks in three DL subframes, the UE QPSK-modulate a bit (1,1) using $n^{(1)}_{PUCCH,2}$ to transmit the modulated bit. If the UE fails decoding of a DL transmission block in a first (i=0) DL subframe and succeeds decoding of DL transmission blocks in remaining subframes, the UE transmits a bit (1,0) on the PUCCH using $n^{(1)}_{PUCCH,2}$.

In the channel selection, if there is at least one ACK, NACK is coupled with DTX. This is because all ACK/NACK states may be expressed by a combination of a reserved PUCCH resource and a QPSK symbol. However, there is no ACK, the DTX is coupled from the NACK.

An existing PUCCH format 1b may transmit only ACK/NACK having 2 bits. However, the PUCCH format 1b using the channel selection represents more ACK/NACK states by linking a combination of allocated PUCCH resources and a modulation symbol (2 bits) to a state of a plurality of ACK/NACK.

Meanwhile, when it is assumed that M DL subframes are connected to UL subframe n, ACK/NACK mismatch between the base station and the user equipment may occur due to missing of the DL subframe (alternatively, PDCCH).

It is assumed that M=3 and the base station transmits three DL transmission blocks through the DL subframe. Since the user equipment may not detect the PDCCH in a second DL subframe, the user equipment may not receive a second transmission block at all and may receive only remaining first and third transmission blocks. In this case, when the ACK/NACK bundling is used, an error in which the user equipment transmits the ACK occurs.

A downlink assignment index (DAI) is included in a DL grant on the PDCCH in order to resolve the error. The DAI indicates the number of accumulated PDCCHs that transmit the assigned PDSCH. A 2-bit DAI value sequentially increases from 1 to be applied with a modulo-4 calculation again from DAI=4. For example, when M=5 and five DL subframes are all scheduled, DAI=1, 2, 3, 4, and 1 may be included in PDCCHs corresponding thereto in the order thereof.

In the TDD, when UL-DL configuration is 5 and the user equipment does not support the aggregation of two or more serving cells, only the bundling is supported.

In the TDD, in the case of the user equipment supporting the aggregation of two or more serving cells, when two or more serving cells are configured, the user equipment transmits the ACK/NACK by using one of the PUCCH format 1b with channel selection or the PUCCH format 3 according to the higher layer configuration.

In the TDD, the user equipment supporting the aggregation of two or more serving cells is configured by the higher layer signal so as to use the bundling and transmits the ACK/NACK by using one of the PUCCH format 1b with channel selection or the PUCCH format 3 according to the upper layer configuration even when one serving cell is configured.

When the ACK/NACK for two or more serving cells is transmitted through the PUCCH format 1b with the channel selection, a mapping table between HARQ-ACK(i) and (PUCCH resource and transmission bit) may be defined as a table given below according to the number (referred to as A) of PUCCH resources used for the channel selection.

TABLE 9

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

TABLE 10

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

TABLE 11

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | | No Transmission |

Table 9 shows a case at A=2, Table 11 shows a case at A=3, and Table 11 shows a case at A=4.

Even in the FDD, a table similar to Tables 9 to 11 is defined and the ACK/NACK may be transmitted according to the table.

The present invention will now be described.

MTC (machine type communication), MU-MIMO (multi-user multi-input multi-output), and CA between TDD cells using different UL-DL configurations may be used in a next generation wireless communication system. Further, the number of simultaneously scheduled UEs may be increased.

Accordingly, a control channel to schedule an existing data channel may be insufficient. In order to solve a resource insufficient phenomenon of a PDCCH being a control channel in a 3GPP LTE, bundled scheduling to schedule a plurality of PDSCHs transmitted through a plurality of subframes or a plurality of cells through one PDCCH is considered or cross-subframe scheduling is considered to flexibly use the PDCCH. The cross-subframe scheduling is to transmit the PDSCH by a PDCCH scheduling the PDSCH from a subframe different from a subframe transmitted from the PDSCH. Meanwhile, introduction of an E-PDCCH (enhanced-PDCCH) except for an existing PDCCH is considered.

<E-PDCCH>

Figure 11:
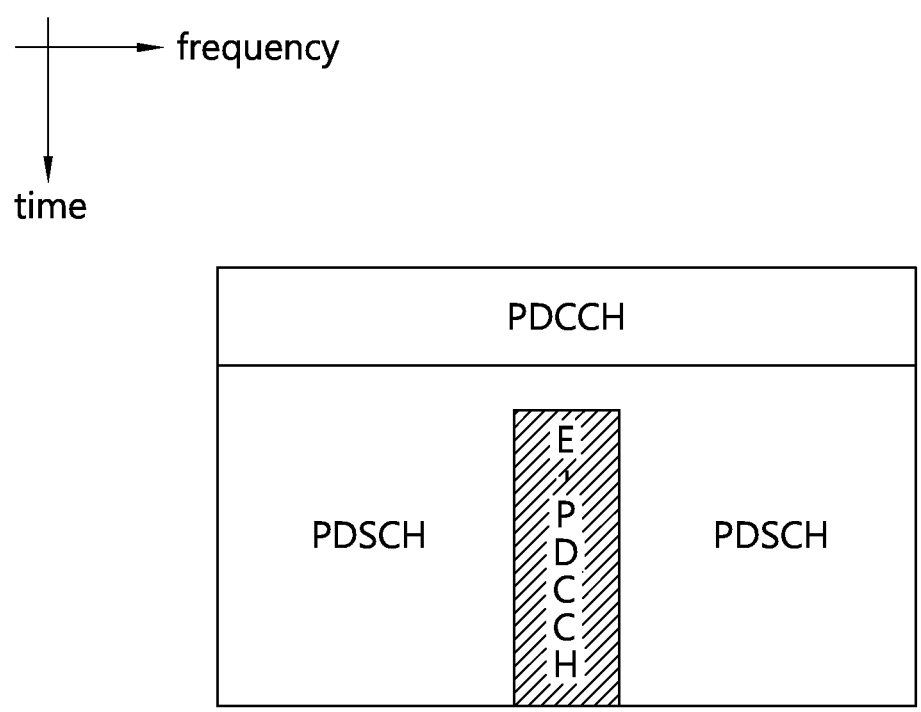
FIG. 11 illustrates an example of E-PDCCH assignment.

FIG. 11 illustrates an example of E-PDCCH assignment.

In LTE-A, assigning and using the E-PDCCH which is a new control channel in the data area has been considered. The E-PDCCH as a control channel configured in the data area in which the PDSCH is transmitted may be a control channel that performs demodulation by using a UE-specific reference signal. That is, the E-PDCCH is clearly distinguished from the assigned area, that is, the PDCCH which is the existing control channel in the reference signal used for the demodulation.

The E-PDCCH may also configure an enhanced-CCE (e-CCE) similarly to the PDCCH and apply implicit PUCCH resource mapping based on the -configured E-CCE. The E-CCE is a configuration unit configuring the E-PDCCH. The quantity of resources included in the E-CCE may be the same as or different from each other the quantity of resources included in a CCE configuring the PDCCH. Further, when the ARI is included in the E-PDCCH, an indication value using the ARI may be used for explicit PUCCH resource selection.

Meanwhile, the number of control channels may be reduced by introducing the semi-persistent scheduling (SPS). As described above, the SPS is a scheduling method that allows the PDSCH to be transmitted through a predetermined radio resource during a predetermined period. The period, the radio resource (subframe) used for the PDSCH transmission, and the like are, in advance, set through the higher layer signal such as the RRC message and activation/deactivation/reactivation of the PDSCH transmission depending on the SPS is indicated by combining respective field values of the PDCCH.

The SPS may be applied only to a specific cell among a plurality of cells, for example, a primary cell according to the system. In addition, the period of the SPS may be at least 10 ms (milli-second).

In the related art, when the SPS is configured, a resource selection method for the ACK/NACK transmission will be described. Hereinafter, an SPS PDSCH represents a PDSCH without corresponding control channels (that is, the PDCCH or E-PDCCH), that is, a data channel not scheduled by the control channel such as the PDSCCH or E-PDCCH. That is, when a plurality of PDSCHs by the SPS exists, the SPS PDSCH may represent remaining PDSCH other than the PDSCH scheduled by an SPS activation/reactivation PDCCH which exists in the same subframe.

Meanwhile, the user equipment may be configured to use the PUCCH format 3 at the time of transmitting a plurality of ACKs/NACKs. The configuration may be performed through the higher layer signal. In this case, the user equipment may transmit the ACK/NACK according to schemes given below.

1. Frequency Division Duplex (FDD).

It is assumed that a UL subframe transmitting the ACK/NACK is, for example, subframe n and a DL subframe corresponding to the UL subframe is, for example, subframe n−k, k=4. In this case, in the DL subframe, 1) one PDSCH exists only in a carrier of the primary cell (PCC) and the PDSCH may be the PDSCH (e.g., SPS PDSCH) without no corresponding PDCCH. Alternatively, 2) one PDSCH exists only in the PCC and the PDSCH with the PDCCH corresponding to the PDSCH may be, that is, the PDSCH scheduled by the PDCCH. Alternatively, 3) one PDCCH exists only in the PCC and the PDCCH may be a PDCCH (e.g., a PDCCH indicating downlink SPS deactivation) requiring an ACK/NACK response.

In the cases of 1) to 3), the user equipment may transmit the ACK/NACK by using the PUCCH format 1a/1b. 1) to 3) may be expressed as even a case in which the ARI required to select the resource for the PUCCH format 3 transmission may not be received from the PDCCH.

In the DL subframe, a case other than the cases of 1) to 3) is referred to as 4). Then, the case of 4) may be expressed as a case in which the ARI required to select the resource for the PUCCH format 3 transmission may be received from the PDCCH. In the case of 4), the user equipment may transmit the ACK/NACK by using the PUCCH format 3.

In 1) to 4), the user equipment uses an implicit PUCCH resource if the implicit PUCCH resource corresponding to the CCE occupied by the PDCCH exists (that is, the cases of 2) and 3)) and uses one resource indicated by the ARI included in the PDCCH among four explicit PUCCH resources assigned to the RRC if not (that is, the cases of 1) and 4)).

2. Time Division Duplex (TDD).

It is assumed that a UL subframe transmitting the ACK/NACK is, for example, subframe n and a DL subframe corresponding to the UL subframe is, for example, subframe n-k. k represents elements included in set K and set K for each subframe may be shown as a table given below.

TABLE 12

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the table, subframe 2 of UL-DL configuration 0 is the UL subframe and K={6} in subframe 2. That is, subframe 2 represents that ACK/NACK for data received in a DL subframe 6 subframes ago is transmitted. Set K has M elements and may be generally expressed as K={$k_0$, $k_1, \ldots, k_{M-1}$}.

In the DL subframe, 1) one PDSCH with no corresponding PDCCH may exist only in the PCC and the PDCCH requiring the ACK/NACK response may not exist. Alternatively, 2) when one PDSCH scheduled by the PDCCH may exist only in the PCC and the DAI of the corresponding PDCCH may be 1. Alternatively, 3) no PDSCH may exist, only one PDCCH requiring the ACK/NACK response may exist, and the DAI of the PDCCH may be 1.

In the cases of 1) to 3), the user equipment transmits the ACK/NACK by using the PUCCH format 1a/1b.

4) The PDCCH with DAI=1, which requires the ACK/NACK response may exist in the DL subframe or one PDSCH scheduled by the PDCCH may exist only in the PCC, and the DAI of the PDCCH may be 1. Simultaneously therewith, only one PDSCH with no corresponding PDCCH may exist.

In this case, the user equipment may transmit the ACK/NACK through the PUCCH format 1a/1b with the channel selection. In this case, a first ACK/NACK (first HARQ-ACK) is associated with the PDSCH with no corresponding PDCCH, a second ACK/NACK (second HARQ-ACK) is associated with a first codeword of the PDSCH scheduled by the PDCCH with DAI=1 or the PDCCH requiring the ACK/NACK response, and a third ACK/NACK (third HARQ-ACK) is associated with a second codeword of the PDSCH scheduled by the PDCCH with DAI=1 or the PDCCH requiring the ACK/NACK response.

A case in which the user equipment transmits the ACK/NACK by using the PUCCH format 1a/1b or the PUCCH format 1a/1b with the channel selection may be expressed as a case in which the ARI required to select the resource for the PUCCH format 3 transmission may not be received from the PDCCH.

5) In a case (that is, the case in which the ARI required to select the resource for the PUCCH format 3 transmission may be received from the PDCCH) other than the cases of 1) to 4) in the DL subframe, the user equipment transmits the ACK/NACK by using the PUCCH format 3.

In this case, if the PDSCH (e.g., SPS PDSCH) with no corresponding PDCCH exists, an ACK/NACK bit for the SPS PDSCH may be positioned at a rearest side of an ACK/NACK bitstream for PDSCHs of the primary cell.

In the case (that is, some of 2), 3), and 4)) in which the implicit PUCCH resource corresponding to CCE occupied by the PDCCH, the user equipment uses the implicit PUCCH resource and in the cases other than the cases 2), 3), and 4), the user equipment uses one resource indicated by the ARI included in the PDCCH among four explicit PUCCH resources assigned to the RRC.

As described above, the PDSCH with no corresponding control channel (PDCCH or E-PDCCH) may be generated by the SPS and the PDSCH is referred to as the SPS PDSCH. The ACK/NACK for the SPS PDSCH is transmitted by using the explicit PUCCH resource configured to the RRC for the SPS.

However, in the related art, only one SPS is permitted in the downlink data (e.g., PDSCH, codeword, and the like) to be acknowledged/non-acknowledged, which are transmitted in one UL subframe or a plurality of DL subframes with the DL channel (e.g., SPS deactivation PDCCH).

However, in the future wireless communication system, a plurality of SPSs may be permitted in the downlink data to be acknowledged/non-acknowledged, which is transmitted in one UL subframe or the plurality of DL subframes with the DL control channel. In other words, only one SPS is permitted and only one SPS PDSCH thus exists in the plurality of DL subframes in the related art, but the plurality of SPSs is permitted, and as a result, the plurality of SPS PDSCHs may exist in the future.

Accordingly, the PUCCH resource selection method and the ACK/NACK transmission method are required with respect to the case in which the plurality of SPSs is permitted in the DL subframes including the targets of the ACK/NACK which are transmitted in the UL subframe.

Hereinafter, the case in which the PUCCH format 3 is applied to the user equipment is exemplified for easy description, but is not limited thereto. The present invention may be applied even to the case in which the PUCCH format 1a/1b with the channel selection is configured in the ACK/NACK transmission. Further, the SPS PDSCH is exemplified, but is not limited thereto. For example, in the bundled subframe scheduling, the PDSCHs included in the first and second subframes may be scheduled through the PDCCH included in the first subframe. In this case, the present invention may be applied even to ACK/NACK transmission for the PDSCH included in the second subframe. That is, the present invention may be applied to ACK/NACK transmission for all PDSCHs which are not directly scheduled by the control channel in the same subframe.

First, a method for configuring the plurality of SPSs will be described.

1) The plurality of SPSs may be configured based on an HARQ process number in the PDCCH indicating the SPS activation/deactivation. That is, different SPSs may be distinguished based on the HARQ process number. 2) Alternatively, the plurality of SPSs may be configured/distinguished based on the index of the cell in the PDCCH the SPS activation/deactivation. That is, the index of the cell to which the SPS PDSCH is to be transmitted may be transmitted with being included in the SPS activation/reactivation PDCCH. In cross carrier scheduling, a carrier index field (CIF) may perform such a role. The CIF may be configured by 3 bits. In the case of non-cross carrier scheduling (that is, self-scheduling), the CIF may indicate a cell to which the control channel is transmitted.

3) Alternatively, the PDCCH indicating the SPS activation/reactivation may indicate the position of a cell/subframe in which the SPS is activated. When the plurality of SPSs is indicated, subframe offset, a cell position, and the like applied for each SPS may be indicated.

4) Alternatively, different IDs, period values, and SPS-C-RNTIs may be applied to the PDCCH indicating the SPS activation/reactivation for each SPS/ The maximum number of SPS PDSCH which may be configured may be set by the RRC, and as a result, a transmission period of each SPS may be set.

Hereinafter, when the plurality of SPSs is permitted, the PUCCH resource selection method will be described.

First Embodiment

Although the plurality of SPSs is permitted, it may be important that the PUCCH resource selection method in the related art (in the related art, the PUCCH resource selection method considering the SPS PDSCH transmitted only to the primary cell) is similarly used. By considering such a point, the plurality of SPSs may be limited so that only one PDSCH scheduled by the SPS exists in the DL subframes (referred to as a DL subframe window for easy description) including targets of the ACK/NACK, which are transmitted in one UL subframe.

For example, when the plurality of SPSs is permitted, the targets of the ACK/NACK, which are transmitted in one UL subframe may exist in DL subframes of a plurality of cells. The DL subframe window including the DL subframes of the plurality of cells may be decided for each UL subframe. In this case, the base station performs scheduling so that only one SPS PDSCH exists in each DL subframe window.

However, in the FDD, when the SPS PDSCH is positioned in a secondary cell, a TPC field of the PDSCH that schedules the PDSCH of the primary cell may be converted to be used as the ARI. By such a method, the user equipment detects the ARI to use the PUCCH format 3. In the TDD, when the SPS PDSCH is positioned in a secondary cell, a TPC field of the PDSCH that schedules the PDSCH of the primary cell may be converted to be used as the ARI. By such a method, the user equipment detects the ARI to use the PUCCH format 3.

For example, in a user equipment in which one FDD cell or a plurality of FDD cells is configured, if the cross subframe scheduling is not used, the DL subframe to be acknowledged/non-acknowledged, which is transmitted in one UL subframe is continuously one DL subframe on a time axis. Accordingly, scheduling is achieved so that only one SPS PDSCH exists in the same DL subframe of different cells (that is, different frequencies). The user equipment may process other cases as the error.

A user equipment is assumed, in which only one TDD cell is configured. In the case of the user equipment, a DL subframe with DL data or a DL control channel to be acknowledged/non-acknowledged, which is transmitted in one UL subframe becomes M DL subframes corresponding to the elements of set K of Table 7. The base station schedules the plurality of SPSs so that only one SPS PDSCH exists in M DL subframes.

A user equipment is assumed, in which a plurality of TDD cells having the same UL-DL configuration is configured in the TDD. In the case of the user equipment, the DL subframe with DL data or a DL control channel to be acknowledged/non-acknowledged, which is transmitted in one UL subframe as subframes corresponding to M DL subframes corresponding to the elements of set K of Table 7 may exist in different TDD cells (that is, different frequencies). The base station schedules the plurality of SPSs so that only one SPS PDSCH exists in the subframes.

Meanwhile, a plurality of TDD cells having UL and DL configurations which are not the same as each other may be configured for the user equipment. In this case, the DL subframes with the DL data or the DL control channel to be acknowledged/non-acknowledged, which is transmitted in one UL subframe are decided according to a reference UL-DL configuration configured for each cell. According to Table 7, it is assumed that set K decided in the UL subframe for each cell is $K^{ref}_c$ and the number of elements of $K^{ref}_c$ is $M^{ref}_c$. Herein, c represents an index of a configured cell. Then, the base station may perform scheduling so that only one SPS PDSCH exists throughout an interval of $M^{ref}_c$ DL subframes in each cell.

Meanwhile, a user equipment may also exist, in which both the TDD cell and the FDD cell are configured. In this case, the DL subframe with the DL data or the DL control channel to be acknowledged/non-acknowledged, which is transmitted in one UL subframe may be decided for each cell. According to Table 7, it is assumed that set K decided in the UL subframe for each cell is $K^{ref}_c$ and the number of elements of $K^{ref}_c$ is $M^{ref}_c$. Herein, c represents the index of the configured cell. Then, the base station may perform scheduling so that only one SPS PDSCH exists throughout the interval of $M^{ref}_c$ DL subframes in each cell. When the FDD cell is the primary cell, $M^{ref}_{Pcell}=1$, $M^{ref}_{Scell}=M^{Cell-specific}_{Scell}$ may be achieved. When the TDD cell is the primary cell, $M^{ref}_{Pcell}=M^{Cell-specific}_{Pcell}$ and the reference UL-DL configuration in the FDD cell follows the UL-DL configuration of the primary cell. In the FDD cell, $M^{ref}_{Scell}=M^{Cell-specific}_{Pcell}$.

Second Embodiment

In this method, it is permitted that a plurality of SPSs exists in a plurality of DL subframes with the DL data or DL control channel to be acknowledged/non-acknowledged, which is transmitted in one UL subframe. The plurality of DL subframes may exist in the same cell or different cells.

Figure 12:
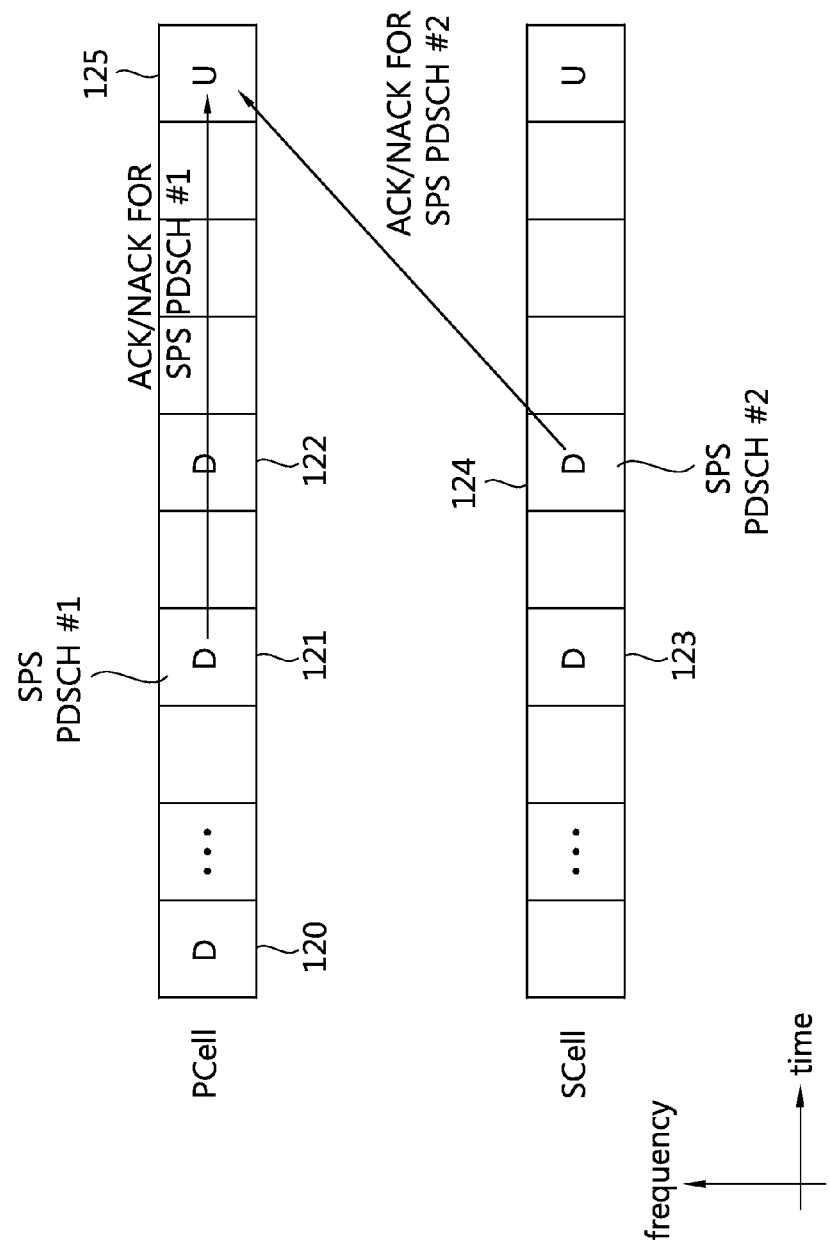
FIG. 12 illustrates a method for transmitting an ACK/NACK according to a second embodiment.

FIG. 12 illustrates a method for transmitting an ACK/NACK according to a second embodiment.

Referring to FIG. 12, DL subframes to be acknowledged/non-acknowledged, which are transmitted in a UL subframe 125 of the primary cell may be DL subframes 121 and 122 of the primary cell and DL subframes 123 and 124 of the secondary cell.

In this case, the case may occur, in which only an ACK/NACK for two SPS PDSCH (SPS PDSCHs #1 and #2) should be transmitted in the UL subframe 125.

In this case, the resource for the PUCCH format 3 should be indicated through an ARI of PDCCHs included in the DL subframes 121 and 124 in order to transmit the PUCCH format 3 in the UL subframe 125. However, as illustrated in FIG. 12, since the PDSCH (SPS PDSCH) with no corresponding PDCCH is transmitted in the DL subframes 121 and 124, it is difficult to transmit the ACK/NACK by using the PUCCH format 3.

In order to solve the problem, as a PUCCH resource used in the UL subframe 125, a resource explicitly indicated through an ARI included in the SPS activation PDCCH may be used among a plurality of (e.g., four) PUCCH format 1a/1b resources configured through the RRC in advance. The SPS activation PDCCH may be transmitted in the DL subframe 120 of the primary cell.

In the resource indication method, the resource may be indicated through the ARI of each SPS activation (alternatively, reactivation, the rest part is the same as above) among four resources (configured through the RRC) decided for each SPS PDSCH transmission time. Alternatively, 2) four resources which are common to all SPS PDSCHs may be configured by the RRC and indicated through the ARI of each SPS activation PDCCH. Alternatively, 3) four resources which are common to all SPS PDSCHs may be configured by the RRC and indicated through the ARI included in one SPS activation PDCCH indicating activation/reactivation of the plurality of SPSs. In this case, ARI values for the respective SPSs are the same as each other.

When at most two SPS PDSCHs are configured, the ACK/NACK may be transmitted by the following method. A method to be described below may be applied to a case in which although only one SPS PDSCH is activated, other SPS PDSCHs are also activated. Further, the method may be applied even to a case in which only two SPS PDSCHs are activated while three or more SPS PDSCHs are configurable.

the ACK/NACK for each of two SPS PDSCHs is mapped to constellations of I and Q of the PUCCH format 1b to be transmitted by using the PUCCH format 1b. In this case, it is assumed that only one ACK/NACK is transmitted for each SPS PDSCH. I of the constellation includes j and −j and Q includes 1 and −1. In this case, for example, when a first SPS PDSCH is the ACK, I may be decided as j and when the first SPS PDSCH is the NACK, I may be decided as −j. When a second SPS PDSCH is the ACK, Q may be decided as 1 and when the second SPS PDSCH is the NACK, Q may be decided as −1. Then, constellation points of the I and Q are decided according to the ACK/NACK for each of two SPS PDSCHs. Meanwhile, in the case where transmission of two codewords to one SPS PDSCH is permitted, the present invention may be applied after ACKs/NACKs for two codewords are spatially bundled to be made into one ACK/NACK.

It is necessary to decide for which SPS PDSCH of two SPS PDSCHs the ACK/NACK is to be mapped to I. That is, the order of mapping the ACKs/NACKs for two SPS PDSCHs to the constellations I and Q may be decided based on 3) an order (this may be applied even when the SPS is applied for each cell) of the cell index in which the SPS PDSCH is configured, 2) a temporal order of subframes in which the SPS PDSCH is transmitted, and 3) an order set by the RRC in advance. The order set by the RRC may be decided in the step of setting the SPS period through the RRC message. The order may be directly or indirectly notified for each SPS in the SPS activation. The SPS may correspond to a corresponding HARQ process order, a positioned cell, an activated subframe, a subframe in which the SPS PDSCH is transmitted, a separately designated ID, each SPS-C-RNTI, or the like. 4) Alternatively, the mapping order may be decided as a temporal order in which the SPS PDSCH is activated.

For 1) to 4) described above, the resource commonly configured by the RRC is preferably used, but an RRC resource corresponding to an SPS PDSCH mapped to a specific constellation may be used.

B) ACKs/NACKs for two SPS PDSCHs may be transmitted by using the PUCCH format 1b with the channel selection.

1) As the PUCCH resource, the explicit resource assigned for each SPS PDSCH may be used. The ACKs/NACKs for two SPS PDSCHs may be transmitted by using a channel selection mapping table defined with respect to an SPS PDSCH transmitting only a single codeword and two PUCCH resources. Two codewords may be transmitted in each SPS PDSCH. In this case, the spatial bundling may be applied to each SPS PDSCH or the number (e.g., 3 or 4) of PUCCH resources is increased to be applied to each SPS PDSCH.

For example, it is assumed that one of two SPS PDSCHs is a transmission mode to transmit only a single codeword and the other one is a transmission mode to transmit two codewords. In this case, a channel selection scheme may be used, which the ACK/NACK is transmitted by configuring three PUCCH resources and thereafter, selecting one PUCCH resource.

Further, in the case where two SPS PDSCHs are both set in the transmission mode to transmit two codewords, a channel selection scheme may be used, which the ACK/NACK is transmitted by configuring four PUCCH resources and thereafter, selecting one PUCCH resource. In the case where the SPSP PDSCH is set in the transmission mode to transmit two codewords, it is assumed and applied that two codewords are received even though only one codeword is actually received through the SPS PDSCH.

2) The channel selection may be used based on a consecutive ACK counting value for the plurality of SPS PDSCHs. When the SPS PDSCH is set in the transmission mode to transmit two codewords, the spatial bundling is applied to the ACK/NACK for the SPS PDSCH. This may be applied even though the number of SPS PDSCHs is 2 or more.

Meanwhile, a case is assumed, in which the UL-DL configuration 0 is applied to the primary cell in the FDD or TDD. In this case, it is assumed that the SPS is configured in one or more secondary cells and a PDSCH with a corresponding PDCCH is detected in the primary cell. When the PDSCH of the primary cell is scheduled, the TPC field of the corresponding PDCCH is not used as the ARI, and as a result, the PUCCH format 3 is not used. The following method may be used for an ACK/NACK for such a case. A method to be described below may be applied to a case in which although only one SPS PDSCH is activated, other SPS PDSCHs are also activated. Further, the method may be applied even to a case in which a maximum number of SPS PDSCHs are not configured but only two SPS PDSCHs are activated.

Hereinafter, HARQ-ACK(0) means the first ACK/NACK, HARQ-ACK(1) means the second ACK/NACK, HARQ-ACK(2) means the third ACK/NACK, and HARQ-ACK(3) means the fourth ACK/NACK.

C) The ACK/NACK may be transmitted by using a mapping table of the PUCCH format 1b with the channel selection and the HARQ-ACK.

1) In the case where the transmission mode of the primary cell is the transmission mode to transmit two codewords and only one SPS PDSCH is configured, the first ACK/NACK corresponds to a first codeword of the PDSCH of the primary cell with the corresponding PDCCH or a PDCCH indicating DL SPS deactivation of the primary cell. In addition, the second ACK/NACK corresponds to a second codeword of the PDSCH of the primary cell with the corresponding PDCCH. Moreover, the third ACK/NACK corresponds to a first codeword of the SPS PDSCH. In this case, the ACK/NACK may be transmitted by using channel selection using three PUCCH format resources and a mapping table for the channel selection.

If the SPS PDSCH is set in the transmission mode to transmit two codewords, the spatial bundling is applied to transmit the ACK/NACK by using the channel selection using three PUCCH format resources and the mapping table for the channel selection. Alternatively, the third ACK/NACK may correspond to the first codeword of the SPS PDSCH and the fourth ACK/NACK may correspond to the second codeword of the SPS PDSCH. In this case, the ACK/NACK may be transmitted by using channel selection using four PUCCH format resources and a mapping table for the channel selection.

2) A case is described, in which the transmission mode of the primary cell is the transmission mode to permit only transmission of the single codeword and only one SPS PDSCH is configured. In this case, the first ACK/NACK corresponds to the first codeword of the PDSCH of the primary cell with the corresponding PDCCH or the PDCCH indicating the DL SPS deactivation of the primary cell. Moreover, the second ACK/NACK corresponds to the first codeword of the SPS PDSCH. Therefore, the ACK/NACK may be transmitted by using channel selection using two PUCCH format resources and a mapping table for the channel selection.

If the SPS PDSCH is set in the transmission mode to transmit two codewords, the spatial bundling is applied to transmit the ACK/NACK by using the channel selection using two PUCCH format resources and the mapping table for the channel selection. Alternatively, the second ACK/NACK may correspond to the first codeword of the SPS PDSCH and the third ACK/NACK may correspond to the second codeword of the SPS PDSCH. In this case, the ACK/NACK may be transmitted by using the channel selection using four PUCCH format resources and the mapping table for the channel selection.

If a mapping table for channel selection for the FDD using three PUCCH format resources is used, the ACK/NACK for the PDSCH including two codewords may be first disposed. That is, the ACK/NACK for the first codeword of the SPS PDSCH may correspond to HARQ-ACK(0), the ACK/NACK for the second codeword of the SPS PDSCH may correspond to HARQ-ACK(1), and the ACK/NACK for the first codeword of the PDSCH of the primary cell with the corresponding PDCCH or the ACK/NACK for the downlink SPS deactivation PDCCH of the primary cell may correspond to HARQ-ACK(2).

3) A case is described, in which the transmission mode of the primary cell is the transmission mode to transmit two codewords and only two SPS PDSCHs are configured. In this case, the first ACK/NACK (that is, HARQ-ACK(0)) corresponds to the first codeword of the PDSCH of the primary cell with the corresponding PDCCH or the ACK/NACK for the downlink SPS deactivation PDCCH of the primary cell. In addition, the second ACK/NACK corresponds to the second codeword of the PDSCH of the primary cell with the corresponding PDCCH. The third ACK/NACK may correspond to the first codeword of the first SPS PDSCH and the fourth ACK/NACK may correspond to the second codeword of the second SPS PDSCH. That is, the ACK/NACK may be transmitted by using the channel selection using four PUCCH format resources and the mapping table for the channel selection. If the transmission mode of the SPS PDSCH is the transmission mode to transmit two codewords, the spatial bundling may be applied.

4) A case is described, in which the transmission mode of the primary cell is the transmission mode to transmit the single codeword and only two SPS PDSCHs are configured. In this case, the first ACK/NACK corresponds to the first codeword of the PDSCH of the primary cell with the corresponding PDCCH or the PDCCH indicating the DL SPS deactivation of the primary cell. The second ACK/NACK corresponds to the first codeword of the first SPS PDSCH and the third ACK/NACK may correspond to the first codeword of the second SPS PDSCH. That is, the ACK/NACK may be transmitted by using the channel selection using three PUCCH format resources and the mapping table for the channel selection.

If the SPS PDSCH is set in the transmission mode to transmit two codewords, the spatial bundling may be applied.

If the mapping table for the channel selection for the FDD using three PUCCH format resources is used, the order of the ACKs/NACKs for two SPS PDSCHs may be decided so that constellation mapping at the time of transmitting only two ACKs/NACKs to one PUCCH and constellation mapping at the time of using the channel selection coincide with each other. That is, the ACK/NACK for the first codeword of the SPS PDSCH may correspond to HARQ-ACK(0), the ACK/NACK for the second codeword of the SPS PDSCH may correspond to HARQ-ACK(1), and the ACK/NACK for the first codeword of the PDSCH of the primary cell with the corresponding PDCCH or the ACK/NACK for the downlink SPS deactivation PDCCH of the primary cell may correspond to HARQ-ACK(2).

5) A case is described, in which the transmission mode of the primary cell is the transmission mode to transmit two codewords and only two SPS PDSCHs are configured. In this case, the first ACK/NACK corresponds to the first codeword of the PDSCH of the primary cell with the corresponding PDCCH or the PDCCH indicating the DL SPS deactivation of the primary cell. In addition, the second ACK/NACK corresponds to a second codeword of the PDSCH of the primary cell with the corresponding PDCCH. Further, the third ACK/NACK and the fourth ACK/NACK are mapped to the consecutive ACK counting value for the plurality of SPS PDSCHs, that is, the consecutive ACK counting value. In this case, the mapping table using four PUCCH formats is used. When the SPS PDSCH is set in the transmission mode to transmit two codewords, the spatial bundling is applied to the ACK/NACK and thereafter, the method is applied.

6) A case is described, in which the transmission mode of the primary cell is the transmission mode to transmit only the single codeword and only two SPS PDSCHs are configured. In this case, the first ACK/NACK corresponds to the first codeword of the PDSCH of the primary cell with the corresponding PDCCH or the PDCCH indicating the DL SPS deactivation of the primary cell. The second ACK/NACK and the third ACK/NACK are mapped to the consecutive ACK counting value for the plurality of SPS PDSCHs, that is, the consecutive ACK counting value. In this case, the mapping table using three PUCCH formats is used. When the SPS PDSCH is set in the transmission mode to transmit two codewords, the spatial bundling is applied to the ACK/NACK and thereafter, the method is applied.

If the mapping table for the channel selection for the FDD using three PUCCH format resources is used, the order of the ACKs/NACKs for two SPS PDSCHs may be decided so that constellation mapping at the time of transmitting only two ACKs/NACKs to one PUCCH and constellation mapping at the time of using the channel selection coincide with each other. That is, the consecutive ACK counting value may be mapped to HARQ-ACK(0) and HARQ-ACK(1) and the ACK/NACK for the first codeword of the PDSCH of the primary cell with the corresponding PDCCH or the ACK/NACK for the downlink SPS deactivation PDCCH of the primary cell may correspond to HARQ-ACK(2).

Meanwhile, in the TDD, the SPS PDSCH may be configured in one or more secondary cells and the PDSCH of the primary cell scheduled to the PDCCH with DAI=1 may be detected. In this case, the corresponding ACK/NACK may be used through the following method. The case may be a case in which the TCP field of the PDCCH is not used as the ARI, and as a result, the PUCCH format 3 is not used when the PDSCH of the primary cell is scheduled. A method to be described below may be applied to a case in which although only one SPS PDSCH is activated, other SPS PDSCHs are also activated. Further, the method may be applied even to a case in which a maximum number of SPS PDSCHs are not configured but only two SPS PDSCHs are activated.

D) A method using the mapping table of the PUCCH format 1b using the channel selection and the HARQ-ACK.

1) In the case where the transmission mode of the primary cell is the transmission mode to transmit two codewords and only one SPS PDSCH is configured, the first ACK/NACK corresponds to the first codeword of the PDSCH of the primary cell with the corresponding PDCCH (DAI=1) or the PDCCH (DAI=1) indicating DL SPS deactivation of the primary cell. In addition, the second ACK/NACK corresponds to the second codeword of the PDSCH of the primary cell with the corresponding PDCCH (DAI=1). Moreover, the third ACK/NACK corresponds to the first codeword of the SPS PDSCH. In this case, the ACK/NACK may be transmitted by using the channel selection using three PUCCH format resources and the mapping table for the channel selection.

If the SPS PDSCH is configured in the transmission mode to transmit two codewords, the spatial bundling is applied to transmit the ACK/NACK by using the channel selection using three PUCCH format resources and the mapping table for the channel selection. Alternatively, the third ACK/NACK may correspond to the first codeword of the SPS PDSCH and the fourth ACK/NACK may correspond to the second codeword of the SPS PDSCH. In this case, the ACK/NACK may be transmitted by using the channel selection using four PUCCH format resources and the mapping table for the channel selection.

2) A case is described, in which the transmission mode of the primary cell is the transmission mode to permit only transmission of the single codeword and only one SPS PDSCH is configured. In this case, the first ACK/NACK corresponds to the first codeword of the PDSCH of the primary cell with the corresponding PDCCH (DAI=1) or the PDCCH (DAI=1) indicating the DL SPS deactivation of the primary cell. Moreover, the second ACK/NACK corresponds to the first codeword of the SPS PDSCH. Therefore, the ACK/NACK may be transmitted by using the channel selection using two PUCCH format resources and the mapping table for the channel selection.

If the SPS PDSCH is set in the transmission mode to transmit two codewords, the spatial bundling is applied to transmit the ACK/NACK by using the channel selection using two PUCCH format resources and the mapping table for the channel selection. Alternatively, the second ACK/NACK may correspond to the first codeword of the SPS PDSCH and the third ACK/NACK may correspond to the second codeword of the SPS PDSCH. In this case, the ACK/NACK may be transmitted by using the channel selection using three PUCCH format resources and the mapping table for the channel selection.

3) A case is described, in which the transmission mode of the primary cell is the transmission mode to transmit two codewords and only two SPS PDSCHs are configured. In this case, the first ACK/NACK (that is, HARQ-ACK(0)) corresponds to the first codeword of the PDSCH of the primary cell with the corresponding PDCCH (DAI=1) or the ACK/NACK for the downlink SPS deactivation PDCCH (DAI=1) of the primary cell. In addition, the second ACK/NACK corresponds to the second codeword of the PDSCH of the primary cell with the corresponding PDCCH (DAI=1). The third ACK/NACK corresponds to the first codeword of the first SPS PDSCH and the fourth ACK/NACK corresponds to the first codeword of the second SPS PDSCH. That is, the ACK/NACK may be transmitted by using the channel selection using four PUCCH format resources and the mapping table for the channel selection. If the transmission mode of the SPS PDSCH is the transmission mode to transmit two codewords, the spatial bundling may be applied.

4) A case is described, in which the transmission mode of the primary cell is the transmission mode to transmit the single codeword and only two SPS PDSCHs are configured. In this case, the first ACK/NACK corresponds to the first codeword of the PDSCH of the primary cell with the corresponding PDCCH (DAI=1) or the PDCCH (DAI=1) indicating the DL SPS deactivation of the primary cell. The second ACK/NACK corresponds to the first codeword of the first SPS PDSCH and the third ACK/NACK may correspond to the first codeword of the second SPS PDSCH. That is, the ACK/NACK may be transmitted by using the channel selection using three PUCCH format resources and the mapping table for the channel selection. If the SPS PDSCH is set in the transmission mode to transmit two codewords, the spatial bundling may be applied.

5) A case is described, in which the transmission mode of the primary cell is the transmission mode to transmit two codewords and only two SPS PDSCHs are configured. In this case, the first ACK/NACK corresponds to the first codeword of the PDSCH of the primary cell with the corresponding PDCCH (DAI=1) or the PDCCH (DAI=1) indicating the DL SPS deactivation of the primary cell. In addition, the second ACK/NACK corresponds to the second codeword of the PDSCH of the primary cell with the corresponding PDCCH (DAI=1). Further, the third ACK/NACK and the fourth ACK/NACK are mapped to the consecutive ACK counting value for the plurality of SPS PDSCHs, that is, the consecutive ACK counting value. In this case, the mapping table using four PUCCH formats is used. When the SPS PDSCH is set in the transmission mode to transmit two codewords, the spatial bundling is applied to the ACK/NACK and thereafter, the method is applied.

6) A case is described, in which the transmission mode of the primary cell is the transmission mode to transmit only the single codeword and only two SPS PDSCHs are configured. In this case, the first ACK/NACK corresponds to the first codeword of the PDSCH of the primary cell with the corresponding PDCCH (DAI=1) or the PDCCH (DAI=1) indicating the DL SPS deactivation of the primary cell. The second ACK/NACK and the third ACK/NACK are mapped to the consecutive ACK counting value for the plurality of SPS PDSCHs, that is, the consecutive ACK counting value. In this case, the mapping table using three PUCCH formats is used. When the SPS PDSCH is set in the transmission mode to transmit two codewords, the spatial bundling is applied to the ACK/NACK.

In the aforementioned methods of B), C), and D), a mapping order of the HARQ-ACK for the SPS PDSCH may be based on one or one or more combinations of 1) to 5) described below.

1) The mapping order of the HARQ-ACK for the SPS PDSCH may be decided in an index order (this may be applied even to a case in which the SPS is applied for each cell) of a cell in which the SPS PDSCH is configured, 2) a temporal order of subframes in which the SPS PDSCH is transmitted, 3) an order (may decided when the period is set by the RRC for the SPS and directly/indirectly notified for each target SPS in the SPS activation. The SPS may correspond to a corresponding HDARQ process number, a positioned cell, an activated subframe, a separately designated ID, each SPS-C-RNTI, or the like) set by the RRC in advance, 4) a temporal order in which the SPS PDSCH is activated, and 5) the order of the transmission mode to transmit two codewords and the transmission mode to transmit the single codeword when the transmission varies for each SPS PDSCH.

Third Embodiment

It is assumed that the plurality of PDSCHs (that is, SPS PDSCHs) scheduled to the SPS and with no corresponding PDCCH is permitted to exist in the plurality of DL subframes with the DL data or DL data channel to be acknowledged/non-acknowledged, which is transmitted in one UL subframe and the plurality of SPS PDSCHs is actually scheduled.

In this case, all ACKs/NACKs may be transmitted through the PUCCH format 3 by using a value indicated by the ARI included in the PDCCH (SPS activation PDCCH) indicating the downlink SPS activation. Herein, as an ARI transmission field, the TPC field may be adopted.

Figure 13:
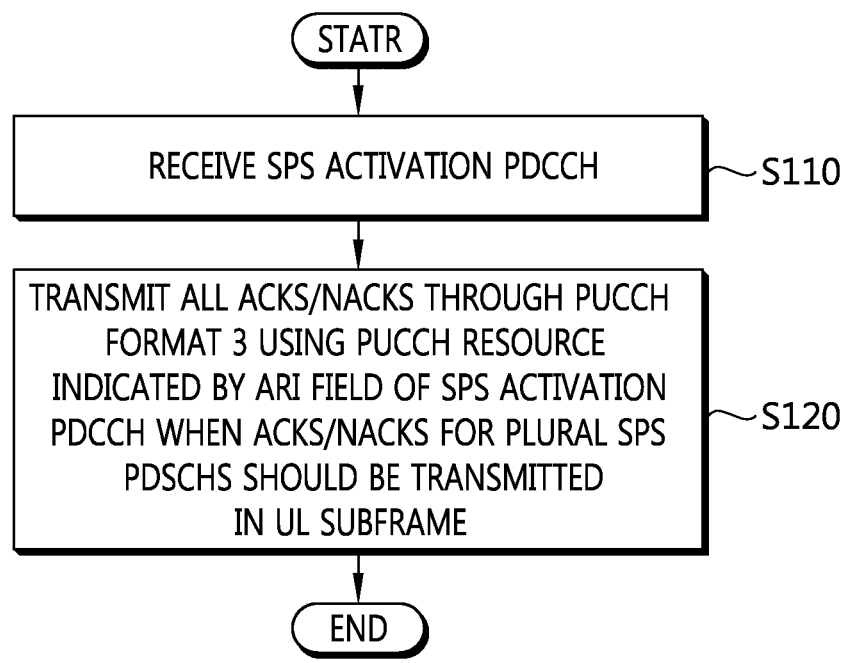
FIG. 13 illustrates a method for transmitting an ACK/NACK according to an embodiment of the present invention.

FIG. 13 illustrates a method for transmitting an ACK/NACK according to an embodiment of the present invention.

Referring to FIG. 13, a user equipment receives an SPS activation PDCCH from a base station (S110). The user equipment may receive a parameter required for SPS through a higher layer signal such as an RRC message before receiving the SPS activation PDCCH.

A TPC field included in the SPS activation PDCCH is analyzed by an ARI.

When the user equipment transmits an ACK/NACK for a plurality of SPS PDSCHs in a UL subframe, all ACKs/NACKs may be transmitted through PUCCH format 3 using a value (this value consequently indicates a PUCCH resource) indicated by an ARI field of the SPS activation PDCCH (S120).

The method may be limited to be applied even to a case in which the number of SPS PDSCHs is a specific number (e.g., 2 or 3) or more. The respective SPS PDSCHs may be transmitted by separate SPSs. In this case, the RRC message may indicate the same resources for each SPS and the ARI fields included in the respective SPS activation PDCCHs may have the same value.

A condition to which the method is applied may be limited to 1) a case in which the ACK/NACK should be transmitted through the PUCCH format 3 in a UL subframe in which ACKs/NACKs for SPS PDSCHs received from a plurality of cells including a primary cell and a secondary cell should be transmitted. Alternatively, the condition may be limited to 2) a case in which the ACK/NACK should be transmitted through the PUCCH format 3 in the UL subframe in which the ACK/NACK for the SPS PDSCH of the secondary cell should be transmitted. That is, the UL subframe in which only the ACK/NACK for the SPS PDSCH of the primary cell should be transmitted may be excluded. Alternatively, the condition may be limited to 3) a case in which the ACK/NACK should be transmitted through the PUCCH format 3 in the UL subframe in which the ACK/NACK for one or more SPS PDSCHs should be transmitted. Alternatively, the condition may be applied to 4) all UL subframes configured so that the ACK/NACK is transmitted through the PUCCH format 3 when the plurality of SPS PDSCHs is configured. However, when the user equipment receives only a PDSCH of the primary cell with a corresponding PDCCH in FDD or when the user equipments receives only a PDSCH of the primary cell with a corresponding PDCCH (DAI=1) in TDD, the corresponding ACK/NACK may be exceptively transmitted through PUCCH format 1a/1b.

The ARI included in the SPS activation PDCCH is used to indicate a resource for transmitting the ACK/NACK for the SPS PDSCH. However, the ARI may be included even in the PDCCH in addition to the SPS activation PDCCH. For example, the ARI may be included in a specific PDCCH for the PUCCH format 1b using channel selection. ARIs for different PUCCH format transmissions may exist and values of the ARIs may be similarly set or the ARI value used for the PUCCH format 1b using the channel selection may be used while the ARI value included in the SPS activation PDCCH is disregarded.

When the user equipment transmits the ACK/NACK through the PUCCH format 3 when the user equipment may detect the ARI. In this case, a layout order of ACK/NACK fields included in the PUCCH format 3 may follow the following order.

1) The ACK/NACK fields may be disposed for each ACK/NACK group targeting each cell. For example, the ACK/NACK for the primary cell is preferentially may be disposed and the ACKs/NACKs of the respective secondary cells may be disposed according to the next cell index order.

In the case of the TDD, since a plurality of ACKs/NACKs for a plurality of DL subframes of one cell may be transmitted, a layout order of ACKs/NACKs for the respective cells also needs to be decided. For example, the ACKs/NACKs are disposed according to a scheduling order of the PDCCH, that is, an order of DAI values of the PDCCH and thereafter, the ACK/NACK for the SPS PDSCH may be disposed.

2) Alternatively, the ACKs/NACKs are first disposed according to the scheduling order (that is, the DAI value order) of the PDCCH of the primary cell and thereafter, the ACK/NACK for the SPS PDSCH may be disposed without distinguishing the cell (that is, without distinguishing the primary cell and the secondary cell). Next, ACKs/NACKs for the secondary cells may be disposed according to the cell index order.

Figure 14:
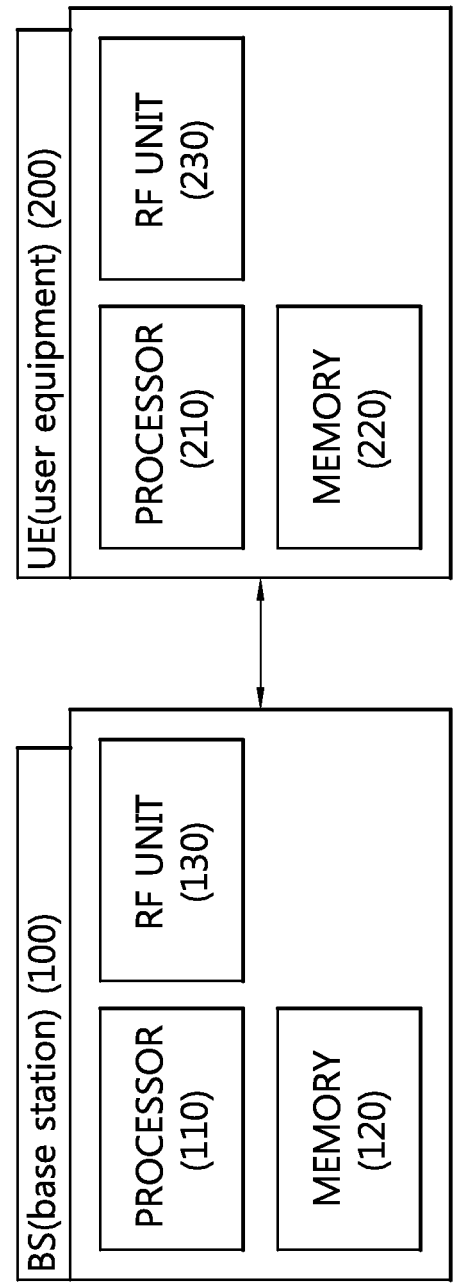
FIG. 14 illustrates configurations of a base station and a user equipment according to an embodiment of the present invention.

FIG. 14 illustrates configurations of a base station and a user equipment according to an embodiment of the present invention.

The base station 100 includes a processor 110, a memory 120, and a radio frequency (RF) unit 130. The processor 110 implements a function, a process, and/or a method which are proposed. The memory 120 is connected with the processor 110 to store various pieces of information for driving the processor 110. The RF unit 130 is connected with the processor 110 to transport and/or receive the radio signal.

The user equipment 200 includes a processor 210, a memory 220, and an RF unit 230. The processor 210 implements a function, a process, and/or a method which are proposed. The memory 220 is connected with the processor 210 to store various pieces of information for driving the processor 210. The RF unit 230 is connected with the processor 210 to transport and/or receive the radio signal.

The processors 110 and 210 may include an application-specific integrated circuit (ASIC), other chipset, a logic circuit, a data processing device, and/or a converter that converts a baseband signal and a radio signal to each other. The memories 120 and 220 may include a read-only memory (ROM), a random access memory (RAM0, a flash memory, a memory card, a storage medium, and/or other storage device. The RF units 130 and 230 may include one or more antennas that transmit and/or receive the radio signal. When the embodiment is implemented by software, the aforementioned technique may be implemented by a module (a process, a function, and the like) that performs the aforementioned function. The module may be stored in the memories 120 and 220 and may be executed by the processors 110 and 210. The memories 120 and 220 may be present inside or outside the processors 110 and 210 and connected with the processors 110 and 210 by various well-known means.

What is claimed is:

1. A method for transmitting an acknowledgement/non-acknowledgement (ACK/NACK) in a wireless communication system, the method comprising:

receiving a control channel indicating activation or reactivation of semi-persistent scheduling (SPS);

receiving at least two downlink subframes among a plurality of downlink subframes; and transmitting ACKs/NACKs for the at least two downlink subframes in an uplink subframe, wherein at least two data channels by the SPS are configurable in the plurality of downlink subframes, and wherein if the at least two data channels by the SPS are included in the at least two downlink subframes, a specific field of the control channel indicating the activation or reactivation of the SPS indicates resources for transmitting all ACKs/NACKs for the at least two downlink subframes.

2. The method of claim 1, wherein only one data channel by the SPS is configured in the at least two downlink subframes.

3. The method of claim 1, wherein the at least two downlink subframes are subframes divided in a time domain or subframes divided in a frequency domain.

4. The method of claim 1, wherein the control channel includes a cell index indicating the activation or the reactivation of the SPS and the cell index indicates a cell to which the SPS is applied.

5. The method of claim 4, wherein the cell index is plural.

6. The method of claim 4, wherein a field including the cell index is configured with 3 bits.

7. An apparatus for transmitting an acknowledgement/non-acknowledgement (ACK/NACK) in a wireless communication system, the apparatus comprising:

a radio frequency (RF) unit which transmits or receives a radio signal;

and a processor that controls the RF unit to:

receive a control channel indicating activation or reactivation of semi-persistent scheduling (SPS), receive at least two downlink subframes among a plurality of downlink subframes, and transmit ACKs/NACKs for the at least two downlink subframes in an uplink subframe;

wherein at least two data channels by the SPS are configurable in the plurality of downlink subframes, and wherein if the at least two data channels by the SPS are included in the at least two downlink subframes, a specific field of the control channel indicating the activation or reactivation of the SPS indicates resources for transmitting all ACKs/NACKs for the at least two downlink subframes.

* * * * *